US012294480B2

(12) United States Patent
Hamzeh et al.

(10) Patent No.: US 12,294,480 B2
(45) Date of Patent: May 6, 2025

(54) METHODS FOR NETWORK MAINTENANCE

(71) Applicant: CABLE TELEVISION LABORATORIES, INC., Louisville, CO (US)

(72) Inventors: Belal Hamzeh, Westminster, CO (US); Bernardo Huberman, Palo Alto, CA (US); Nicolas Joel Metts, Superior, CO (US); Aarti Munjal, Aurora, CO (US)

(73) Assignee: Cable Television Laboratories, Inc., Louisville, CO (US)

(*) Notice: Subject to any disclaimer, the term of this patent is extended or adjusted under 35 U.S.C. 154(b) by 0 days.

(21) Appl. No.: 16/416,016

(22) Filed: May 17, 2019

(65) Prior Publication Data

US 2019/0356532 A1 Nov. 21, 2019

Related U.S. Application Data

(60) Provisional application No. 62/678,117, filed on May 30, 2018, provisional application No. 62/674,875,
(Continued)

(51) Int. Cl.
| | |
|---|---|
| *G06F 15/173* | (2006.01) |
| *G06F 17/18* | (2006.01) |
| *G06N 20/00* | (2019.01) |
| *H04L 12/24* | (2006.01) |
| *H04L 12/26* | (2006.01) |
| *H04L 41/0273* | (2022.01) |

(Continued)

(52) U.S. Cl.
CPC ......... *H04L 41/0293* (2013.01); *G06N 20/00* (2019.01); *H04L 41/16* (2013.01); *H04L 41/50* (2013.01); *H04L 67/61* (2022.05)

(58) Field of Classification Search
CPC ..... H04L 41/0293; H04L 41/16; H04L 41/50; H04L 67/322; H04L 41/147; G06N 20/00
USPC ......................................................... 709/223
See application file for complete search history.

(56) References Cited

U.S. PATENT DOCUMENTS

| | | | |
|---|---|---|---|
| 6,353,902 B1 * | 3/2002 | Kulatunge | ............ H04L 41/149 714/48 |
| 7,225,250 B1 * | 5/2007 | Harrop | .................. H04L 41/147 709/224 |

(Continued)

*Primary Examiner* — Hee Soo Kim
*Assistant Examiner* — Golam Mahmud
(74) *Attorney, Agent, or Firm* — PdZ Patent Law, PLLC

(57) ABSTRACT

Methods, systems, and devices for network maintenance are described. A controller may receive an indication that the performance of a network device has decreased. The indication may include case identification data associated with the network device. The controller may request proactive network maintenance (PNM) data associated with the network device based on receiving the case identification data. The controller may transmit the PNM data to a machine learning (ML) engine. The ML engine may transmit, to the controller, an indication of a predetermined operation predicted to improve the performance of the network device. The controller may transmit the predetermined operation to a client device based on receiving the indication of the predetermined operation. The ML engine may receive feedback indicating whether an execution of the predetermined operation improved the performance of the network device. The ML engine may a training data set based on the feedback.

14 Claims, 11 Drawing Sheets

Related U.S. Application Data filed on May 22, 2018, provisional application No. 62/672,982, filed on May 17, 2018.

(51) Int. Cl.
*H04L 41/16* (2022.01)
*H04L 41/50* (2022.01)
*H04L 67/61* (2022.01)

(56) References Cited

U.S. PATENT DOCUMENTS

| | | | |
|---|---|---|---|
| 8,989,221 B2 * | 3/2015 | Asati | H04B 10/27 370/252 |
| 8,990,639 B1 * | 3/2015 | Marr | G06F 11/3672 714/25 |
| 9,503,466 B2 * | 11/2016 | Vasseur | H04L 47/41 |
| 9,628,340 B2 * | 4/2017 | Blair | H04L 41/147 |
| 9,825,839 B2 * | 11/2017 | Metts | H04L 43/0847 |
| 9,871,557 B2 * | 1/2018 | Williams | G01R 31/083 |
| 9,948,497 B2 * | 4/2018 | Bencheck | H04L 41/0809 |
| 10,223,644 B2 * | 3/2019 | Gadde | G06N 20/00 |
| 10,680,708 B2 * | 6/2020 | Williams | H04B 10/2589 |
| 11,270,785 B1 * | 3/2022 | Talvola | G16H 50/30 |
| 11,770,321 B2 * | 9/2023 | Rupe | H04L 43/065 370/252 |
| 11,949,531 B2 * | 4/2024 | Yates | H04L 12/2856 |
| 2003/0126256 A1 * | 7/2003 | Cruickshank, III | H04L 43/026 709/224 |
| 2006/0023638 A1 * | 2/2006 | Monaco | H04L 43/0888 370/252 |
| 2007/0208762 A1 * | 9/2007 | Lunt | G06F 16/41 |
| 2008/0183424 A1 * | 7/2008 | Seem | G05B 23/0216 702/181 |
| 2009/0024647 A1 * | 1/2009 | Hein | G06F 16/25 707/999.102 |
| 2009/0031174 A1 * | 1/2009 | Moon | G06F 11/0709 714/E11.19 |
| 2010/0031095 A1 * | 2/2010 | Ruan | G06Q 10/06 714/57 |
| 2011/0314145 A1 * | 12/2011 | Raleigh | H04W 28/12 709/224 |
| 2012/0157089 A1 * | 6/2012 | Yang | H04W 24/08 455/424 |
| 2013/0198767 A1 * | 8/2013 | Wang | H04N 21/6583 725/14 |
| 2013/0227103 A1 * | 8/2013 | Garimella | H04L 41/5054 709/223 |
| 2015/0095960 A1 * | 4/2015 | Hurst | H04N 17/004 725/107 |
| 2015/0317197 A1 * | 11/2015 | Blair | H04L 41/147 714/47.3 |
| 2016/0321677 A1 * | 11/2016 | Dobaj | G06Q 30/0185 |
| 2017/0054605 A1 * | 2/2017 | Duncan | H04L 41/145 |
| 2017/0310562 A1 * | 10/2017 | Jin | H04L 41/5009 |
| 2017/0353991 A1 * | 12/2017 | Tapia | G06Q 10/20 |
| 2018/0005146 A1 * | 1/2018 | Chintalapaty | G06Q 10/063 |
| 2018/0232656 A1 * | 8/2018 | Allen | G06F 11/30 |
| 2019/0306023 A1 * | 10/2019 | Vasseur | G06N 20/20 |
| 2021/0133789 A1 * | 5/2021 | Ghosh | G06Q 20/4093 |

* cited by examiner

METHODS FOR NETWORK MAINTENANCE

CROSS REFERENCES

The present application for patent claims the benefit of U.S. Provisional Patent Application No. 62/672,982 by Hamzeh, et al., entitled AI FRAMEWORK FOR WI-FI PNM," filed May 17, 2018, U.S. Provisional Patent Application No. 62/674,875 by Hamzeh, et al., entitled "AI FRAMEWORK FOR WI-FI PNM," filed May 22, 2018, and U.S. Provisional Patent Application No. 62/678,117 by Hamzeh, et al., entitled "AI WI-FI PROACTIVE NETWORK MAINTENANCE," filed May 30, 2018, each of which are assigned to the assignee hereof, and expressly incorporated herein by reference in their entirety.

BACKGROUND

A system may be configured to communicate over various networks comprised of various network links, including ethernet, Wi-Fi, Long Term Evolution (LTE), and/or cable (e.g., a fiber optic network). Network devices may be used for communicating information between users and/or customers and may have an expected level of performance (e.g., data transmission speed, signal strength, error rate, etc.). In some cases, over time or unexpectedly, the performance of a network device may decrease.

SUMMARY

A system may include various network devices communicating with one another over any appropriate network (e.g., ethernet, Wi-Fi, Long Term Evolution (LTE), 3G, 4G, 5G, 6G, a data over cable service interface specification (DOCSIS) network, a fiber optic network (such as but not limited to a passive optical network (PON), a composite PON (CPON), an ethernet PON (EPON), a gigabit PON (GPON), a radio frequency over glass (RFOG) network, etc.), or any other combination thereof). Network devices may be used for communicating information between users and/or customers and may have an expected level of performance (e.g., data transmission speed, signal strength, error rate, etc.). In some cases, over time or unexpectedly, the performance of a network device may decrease. A user associated with the network device may notice and/or determine the decrease in performance of the network device. The user may contact a vendor or a multiple service operator (MSO) associated with the network device to report the decrease in performance. The vendor or MSO may create a case identification number or other case identification data (e.g., a ticket identifier) corresponding to the network device and indicating a media access control (MAC) address of the network device. The vendor or MSO may attempt to troubleshoot the problem remotely but, in some cases, may send a representative to a location associated with the network device to increase the performance of the network device.

Network devices within the communication system may supply proactive network maintenance (PNM) data to a PNM database. The PNM data may include data collected by the network device related to an operation of the network device. The PNM data (e.g., stored at the PNM database) may be utilized to select a predetermined operation predicted to increase the performance of the network device (e.g., a predicted solution). In some cases utilizing the PNM data to select operations predicted to increase the performance of the network device may decrease a cost of supporting the network device. When a customer reports a network device with a decrease in performance, a machine learning (ML) engine may analyze the PNM data associated with the network device. The ML engine may generate an ordered list of predetermined operations that may increase the performance of the network device. The list may be provided to an operator (e.g., a vendor, technician, etc.). The operator may execute one or more of the predetermined operations until determining that a performance of the network device has improved.

A method for maintaining a network is described. The method may include receiving, from a client device, case identification data associated with a network device, transmitting, to an ML engine, PNM data associated with the network device based on receiving the case identification data, receiving, from the ML engine, an indication of a predetermined operation predicted to impact a performance of the network device, and transmitting the predetermined operation to the client device based on receiving the indication of the predetermined operation.

An apparatus for maintaining a network is described. The apparatus may include a processor, memory in electronic communication with the processor, and instructions stored in the memory. The instructions may be executable by the processor to cause the apparatus to receive, from a client device, case identification data associated with a network device, transmit, to an ML engine, PNM data associated with the network device based on receiving the case identification data, receive, from the ML engine, an indication of a predetermined operation predicted to impact a performance of the network device, and transmit the predetermined operation to the client device based on receiving the indication of the predetermined operation.

Another apparatus for maintaining a network is described. The apparatus may include means for receiving, from a client device, case identification data associated with a network device, means for transmitting, to an ML engine, PNM data associated with the network device based on receiving the case identification data, means for receiving, from the ML engine, an indication of a predetermined operation predicted to impact a performance of the network device, and means for transmitting the predetermined operation to the client device based on receiving the indication of the predetermined operation.

A non-transitory computer-readable medium storing code for maintaining a network is described. The code may include instructions executable by a processor to receive, from a client device, case identification data associated with a network device, transmit, to an ML engine, PNM data associated with the network device based on receiving the case identification data, receive, from the ML engine, an indication of a predetermined operation predicted to impact a performance of the network device, and transmit the predetermined operation to the client device based on receiving the indication of the predetermined operation.

Some examples of the method, apparatuses, and non-transitory computer-readable medium described herein may further include operations, features, means, or instructions for transmitting, to an interface, the case identification data associated with the network device based on receiving the case identification data from the client device, and receiving, from the interface, the PNM data associated with the network device, where transmitting the PNM data to the ML engine may be based on receiving the PNM data from the interface.

Some examples of the method, apparatuses, and non-transitory computer-readable medium described herein may further include operations, features, means, or instructions for determining whether the performance of the network device increases after an implementation of the predetermined operation, and transmitting, to the ML engine, a second indication of whether the performance of the network device increases after the implementation of the predetermined operation.

Some examples of the method, apparatuses, and non-transitory computer-readable medium described herein may further include operations, features, means, or instructions for receiving, from the client device, the second indication of whether the performance of the network device increases after the implementation of the predetermined operation, where determining whether the performance of the network device increases may be based on receiving the second indication from the client device.

Some examples of the method, apparatuses, and non-transitory computer-readable medium described herein may further include operations, features, means, or instructions for receiving second PNM data associated with the network device after transmitting the predetermined operation to the client device, where determining whether the performance of the network device increases after the implementation of the predetermined operation may be based on a comparison of the PNM data and the second PNM data.

Some examples of the method, apparatuses, and non-transitory computer-readable medium described herein may further include operations, features, means, or instructions for receiving, from the client device, a second case identification data different than the case identification data, the second case identification data associated with a second network device, where receiving the second case identification data occurs after transmitting the second indication of whether the performance of the network device increases after the implementation of the predetermined operation, transmitting, to the ML engine, PNM data associated with the second network device based on receiving the second case identification data, and receiving, from the ML engine, a third indication of a predetermined operation predicted to impact the performance of the second network device, where the third indication of the predetermined operation may be based on transmitting the second indication of whether the performance of the network device increases.

Some examples of the method, apparatuses, and non-transitory computer-readable medium described herein may further include operations, features, means, or instructions for receiving a set of indications of predetermined operations predicted to impact the performance of the network device from the ML engine, the set of indications including at least the indication of the predetermined operation, and receiving prioritization data associated with each of a set of predetermined operations indicated by the set of indications, where the prioritization data indicates a recommended order for implementing each of the set of predetermined operations based on a likelihood that implementing the predetermined operation increases the performance of the network device.

Some examples of the method, apparatuses, and non-transitory computer-readable medium described herein may further include operations, features, means, or instructions for receiving, from the client device, an operation different than the predetermined operation that improved the performance of the network device, and transmitting, to the ML engine, the operation received from the client device.

In some examples of the method, apparatuses, and non-transitory computer-readable medium described herein, the case identification data corresponds to a report associated with the network device.

Some examples of the method, apparatuses, and non-transitory computer-readable medium described herein may further include operations, features, means, or instructions for referencing the text database according to the index, and determining the predetermined operation based on text indicated by the index, where transmitting the predetermined operation may be based on the determining the predetermined operation.

In some examples of the method, apparatuses, and non-transitory computer-readable medium described herein, the network device corresponds to an AP.

In some examples of the method, apparatuses, and non-transitory computer-readable medium described herein, the client device corresponds to a device connected to the network and used by an operator.

A method for maintaining a network is described. The method may include receiving, from a user interface associated with a client device, an indication of case identification data associated with a network device, transmitting the case identification data to a controller based on receiving the indication of the case identification data, receiving, from the controller, a set of predetermined operations predicted to impact a performance of the network device, and communicating the set of predetermined operations to the user interface for display according to a likelihood that the predetermined operation impacts the performance of the network device.

An apparatus for maintaining a network is described. The apparatus may include a processor, memory in electronic communication with the processor, and instructions stored in the memory. The instructions may be executable by the processor to cause the apparatus to receive, from a user interface associated with a client device, an indication of case identification data associated with a network device, transmit the case identification data to a controller based on receiving the indication of the case identification data, receive, from the controller, a set of predetermined operations predicted to impact a performance of the network device, and communicate the set of predetermined operations to the user interface for display according to a likelihood that the predetermined operation impacts the performance of the network device.

Another apparatus for maintaining a network is described. The apparatus may include means for receiving, from a user interface associated with a client device, an indication of case identification data associated with a network device, means for transmitting the case identification data to a controller based on receiving the indication of the case identification data, means for receiving, from the controller, a set of predetermined operations predicted to impact a performance of the network device, and means for communicating the set of predetermined operations to the user interface for display according to a likelihood that the predetermined operation impacts the performance of the network device.

A non-transitory computer-readable medium storing code for maintaining a network is described. The code may include instructions executable by a processor to receive, from a user interface associated with a client device, an indication of case identification data associated with a network device, transmit the case identification data to a controller based on receiving the indication of the case identification data, receive, from the controller, a set of predetermined operations predicted to impact a performance of the network device, and communicate the set of predetermined operations to the user interface for display according to a likelihood that the predetermined operation impacts the performance of the network device.

Some examples of the method, apparatuses, and non-transitory computer-readable medium described herein may further include operations, features, means, or instructions for receiving, from the controller, prioritization data corresponding to each of the set of predetermined operations, the prioritization data indicating a recommended order for implementing each of the set of predetermined operations, and ordering each of the indicated predetermined operations based on the prioritization data, where communicating the set of predetermined operations to the user interface may be based on the ordering.

Some examples of the method, apparatuses, and non-transitory computer-readable medium described herein may further include operations, features, means, or instructions for receiving a second indication, from the user interface, that one of the set of predetermined operations improves the performance of the network device, where receiving the second indication may be based on communicating the set of predetermined operations to the user interface, and transmitting the second indication that one of the set of predetermined operations improves the performance of the network device to the controller.

Some examples of the method, apparatuses, and non-transitory computer-readable medium described herein may further include operations, features, means, or instructions for receiving, from the user interface, an operation different than the set of predetermined operations that improved the performance of the network device, and transmitting the operation different than the set of predetermined operations to the controller.

A method for maintaining a network is described. The method may include receiving, from a client device, case identification data associated with a network device, transmitting, to an ML engine, PNM data associated with the network device based on receiving the case identification data, receiving, from the ML engine, an indication of a set of predetermined operations predicted to impact a performance of the network device, and transmitting, to the network device, a command associated with a first predetermined operation of the set of predetermined operations, where an execution of the command initiates the first predetermined operation at the network device.

An apparatus for maintaining a network is described. The apparatus may include a processor, memory in electronic communication with the processor, and instructions stored in the memory. The instructions may be executable by the processor to cause the apparatus to receive, from a client device, case identification data associated with a network device, transmit, to an ML engine, PNM data associated with the network device based on receiving the case identification data, receive, from the ML engine, an indication of a set of predetermined operations predicted to impact a performance of the network device, and transmit, to the network device, a command associated with a first predetermined operation of the set of predetermined operations, where an execution of the command initiates the first predetermined operation at the network device.

Another apparatus for maintaining a network is described. The apparatus may include means for receiving, from a client device, case identification data associated with a network device, means for transmitting, to an ML engine, PNM data associated with the network device based on receiving the case identification data, means for receiving, from the ML engine, an indication of a set of predetermined operations predicted to impact a performance of the network device, and means for transmitting, to the network device, a command associated with a first predetermined operation of the set of predetermined operations, where an execution of the command initiates the first predetermined operation at the network device.

A non-transitory computer-readable medium storing code for maintaining a network is described. The code may include instructions executable by a processor to receive, from a client device, case identification data associated with a network device, transmit, to an ML engine, PNM data associated with the network device based on receiving the case identification data, receive, from the ML engine, an indication of a set of predetermined operations predicted to impact a performance of the network device, and transmit, to the network device, a command associated with a first predetermined operation of the set of predetermined operations, where an execution of the command initiates the first predetermined operation at the network device.

In some examples of the method, apparatuses, and non-transitory computer-readable medium described herein, the command to the network device indicates for the network device to restart the network device, change a configuration of the network device, or both.

Some examples of the method, apparatuses, and non-transitory computer-readable medium described herein may further include operations, features, means, or instructions for receiving, from an interface, second PNM data after the execution of the command at the network device, and determining whether the performance of the network device increases after the execution of the command at the network device based on a comparison of the second PNM data and the PNM data.

Some examples of the method, apparatuses, and non-transitory computer-readable medium described herein may further include operations, features, means, or instructions for determining that the performance of the network device may be substantially the same as the performance of the network device prior to the execution of the command based on determining whether the performance of the network device increases after the execution of the command at the network device, and transmitting, to the network device, a second command associated with a second predetermined operation of the set of predetermined operations, where an execution of the second command initiates the second predetermined operation at the network device.

DETAILED DESCRIPTION

Figure 1:
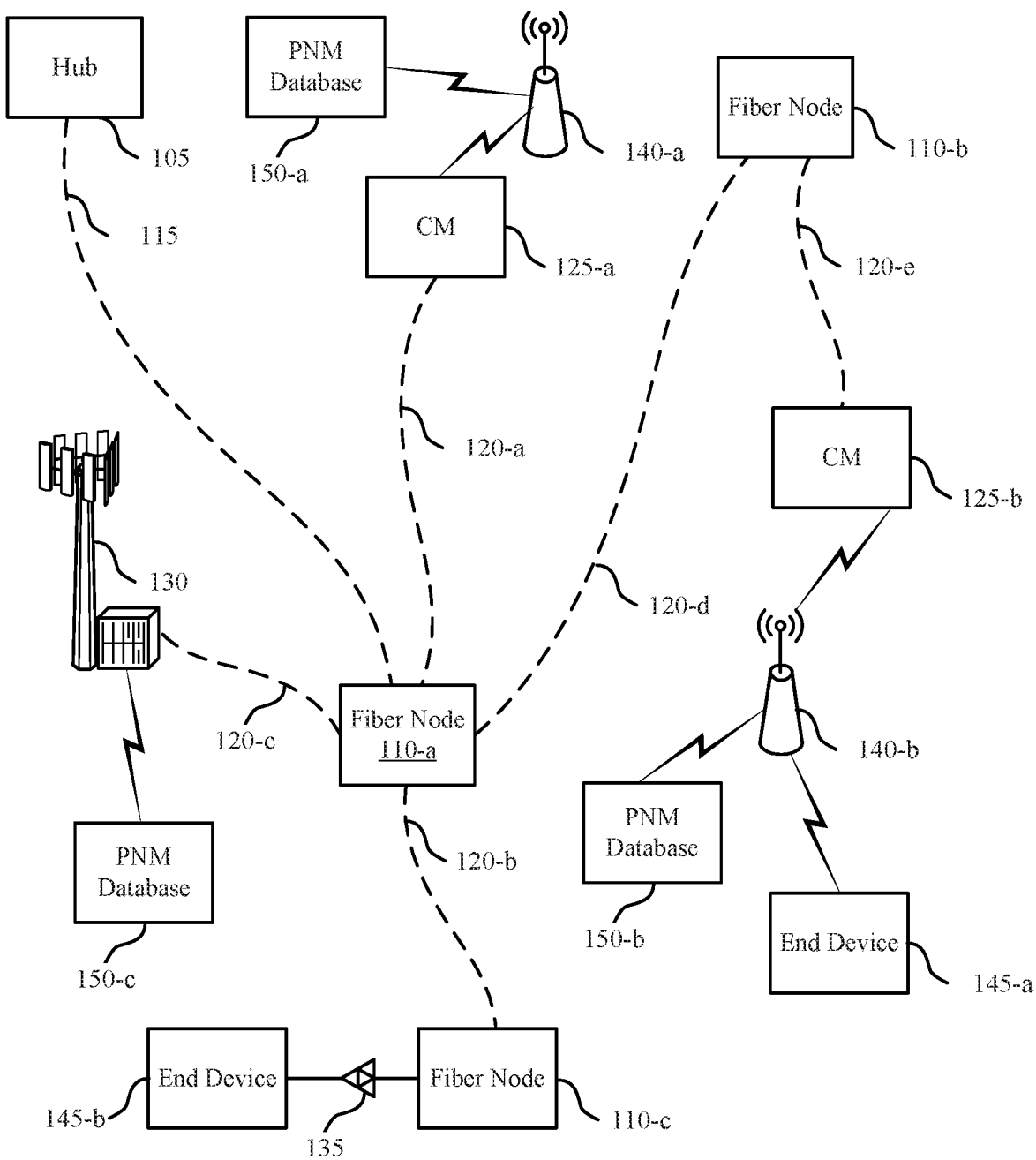
FIGS. 1 and 2 illustrate examples of communication systems that support methods for network maintenance in accordance with aspects of the present disclosure.

Network devices may be used for communicating information between users and/or customers and may have an expected level of performance (e.g., data transmission speed, signal strength, error rate, etc.). In some cases, over time or unexpectedly, the performance of a network device may decrease. A network device may correspond to, for example, a fiber node, a cable modem (CM), a base station, an access point (AP), or a cable modem termination system (CMTS). The performance decrease of the network device may correspond to a decrease in transmission signal strength, a transmission delay increase, or an increase in a number of errors associated with communications at the network device. A user associated with the network device (e.g., a user, a vendor, an operator, etc.) may notice and/or determine the decrease in performance of the network device. The user may contact a vendor or a multiple service operator (MSO) (e.g., an operator of multiple cable or direct-broadcast satellite television systems) associated with the network device to report the decrease in performance. The vendor or MSO may create a case identification number or other case identification data (e.g., a ticket identifier) corresponding to the network device and indicating a media access control (MAC) address of the network device (e.g., a unique identifier assigned to the network device). The vendor or MSO may attempt to troubleshoot the problem remotely but, in some cases, may send a representative to a location associated with the network device to increase the performance of the network device.

Supporting customer service operations or issues (e.g., to generate case identification numbers, associated cases, determine a problem associated with the network device, and execute a solution to increase the performance of the network device) may be expensive, time consuming, and inefficient. For example, representatives responsible for the customer service may not have the training or expertise to properly and/or efficiently determine a likely solution to improve the performance of the network device. In another example, representatives traveling to the location associated with the network device may not arrive prepared to determine or address a cause of the decreased performance of the network device resulting in an inefficient and time consuming process to increase the performance of the network device.

Network devices within the communication system may supply proactive network maintenance (PNM) data to a PNM database. The PNM data may include data collected by the network device related to an operation of the network device. The PNM data (e.g., stored at the PNM database) may be utilized to determine an operation predicted to increase the performance of the network device (e.g., a predicted solution). In some cases utilizing the PNM data to determine operations predicted to increase the performance of the network device may decrease the cost of supporting the network device. When a customer reports a network device associated with a decrease in performance, a machine learning (ML) engine may analyze the PNM data associated with the network device. The ML engine may generate an ordered list of predetermined operations that may increase the performance of the network device. The list may be provided to an operator. The operator may execute one or more of the predetermined operations until determining that a performance of the network device has improved.

An ML engine analyzing PNM data associated with a network device and generating an ordered list of predetermined operations (e.g., corresponding to predicted solutions) may improve a quality of customer service, decrease a cost associated with the customer service, improve efficiency of network device repairs, or a combination thereof.

Features of the disclosure are initially described in the context of communication systems as described with reference to FIGS. 1 and 2. Features of the disclosure are further described in the context of process flows as described with reference to FIGS. 3-5. These and other features of the disclosure are further illustrated by and described with reference to apparatus diagrams, system diagrams, and flowcharts that relate to methods for network maintenance.

FIG. 1 illustrates an example of a communication system 100 that supports methods for network maintenance in accordance with aspects of the present disclosure. The communication system 100 may include hub 105, fiber nodes 110, CMs 125, a base station 130, APs 140, end devices 145, and PNM databases 150. Hub 105 may be an optical hub 105 that is, for example, a central office, a communications hub, or an optical line terminal (OLT). In the embodiment shown, fiber node 110 is illustrated for use with an optical network, such as but not limited to a passive optical network (PON) and its variants. End devices 145 may be downstream termination units, which can represent, for example, a customer device, customer premises (e.g., an apartment building), a business user, or an optical network unit (ONU). Base station 130 is shown as a larger wireless station, such as a macro cell, but may equally, optionally, or additionally include one or more small cells, micro cells, picocells, femtocell, and other versions of radio heads and remote radio heads including split, virtualized, and virtualized radio units. APs 140 may be different types of APs (e.g., for metropolitan areas, home networks, etc.). The APs 140 may communicate according to the wireless local area network (WLAN) radio and baseband protocol for physical and MAC layers from Institute of Electrical and Electronics Engineers (IEEE) 802.11 and versions including, but not limited to, 802.11b, 802.11g, 802.11a, 802.11n, 802.11ac, 802.11ad, 802.11ah, 802.11ax, etc.

Hub 105 may communicate with fiber node 110-*a* by way of optical fiber bundle 115. Optical fiber bundle 115 may be used to communicate both downstream communications to fiber node 110-*a* and upstream communications from fiber node 110-*a* to hub 105. In operation, optical fiber bundle 115 may be 30 km or shorter. However, the optical fiber bundle 115 may be longer, such as between 100 km and 1000 km. In some cases, optical fiber bundle 115 may include only a single fiber or a few individual fibers (e.g., six). In an embodiment, fiber node 110-*a* may connect with other devices by optical fibers 120 (e.g., optical fiber 120-*a*, optical fiber 120-*b*, optical fiber 120-*c*, etc.). For example, fiber node 110-*a* may connect with CM 125-*a* by optical fiber 120-*a* and fiber nodes 110-*b* and 110-*c* by optical fibers 120-*d* and 120-*b* respectively. In some cases, fiber node 110-*a* and CM 125-*a* may be integrated as a single device, such as a cable modem termination system (CMTS), which may be located at or near a customer premises. In cases when the fiber node 110-*a* and other devices (e.g., CM 125-*a*, fiber nodes 110-*b*, 110-*c*, base station 130) are separate devices, optical fibers 120 may span distances of approximately 5000 feet or less, although this may vary depending on the network. The communication system 100 may correspond to an optical service domain group. The optical service domain group may correspond to a group of devices routing communications through fiber node 110-*a*.

Fiber node 110-*a* may be configured to multiplex and aggregate services over fiber access networks, such as but not limited to a cable access network and other access networks. For example, fiber node 110-*a* may receive downstream communications and direct the downstream communications by optical fibers 120 to one or more of the devices (e.g., CMs 125, fiber nodes 110, base station 130, end devices 145). The downstream communications may carry DOCSIS channels, digital video, analog video channels, channels with telemetry information, set top box control channels, internet protocol (IP) protocol data, over-the-top data, telephony channels, and any other data that may be carried over digital and analog networks. In another example, communication system 100 may include EPON services, radio frequency over glass (RFOG) services, in combination with other services.

Fiber node 110-*a* may receive and aggregate upstream communications from CM 125-*a*, fiber nodes 110-*b*, or base station 130. The upstream communications may include DOCSIS channels, set top box return channels, upstream telemetry, and telephony channels. The upstream communications may also include EPON, GPON, RFOG, and Gigabit Ethernet. In some cases, the channels may be multiplexed and a wideband composite signal may be used to intensity modulate an optical carrier (e.g., by an CM 125). The fiber node 110-*a* may combine the upstream signals and communicate them to hub 105. Fiber node 110-*a* may direct communications to other fiber nodes 110. For example, the fiber node 110-*a* may receive downstream communications from hub 105 and direct the communications to other fiber nodes 110 (e.g., fiber nodes 110-*b* and 110-*c*). Here, the receiving fiber nodes 110-*b* and 110-*c* may in turn receive the downstream communications from fiber node 110-*a* and direct the communications accordingly. For example, fiber node 110-*b* may receive downstream communications from fiber node 110-*a* and direct the communications to CM 125-*b* by fiber 120-*e*. Further, fiber node 110-*b* may receive and aggregate upstream communications from CM 125-*b* (and any additional CMs 125 in communication with 110-*b*) and fiber node 110-*b* may direct the upstream communications to fiber node 110-*a*. In some examples, CMs 125 may be located at homes, businesses, and so forth.

The communication system 100 may be or may include a hybrid fiber-coaxial (HFC) network. An HFC network may include both optical fibers 120 and coaxial cables. In a case when communication system 100 includes coaxial cables, fiber nodes 110 may receive and direct communications by optical fibers and coaxial cables. For example, fiber node 110-*c* may receive downstream communications from fiber node 110-*a* by optical fiber 120-*b* and direct the downstream communications by coaxial cables to CMs 125-*d* and 125-*e*. The communication system 100 may include one or more radio frequency (RF) amplifiers 135. The RF amplifiers 135 may be used to amplify signals being communicated by a coaxial cable. For example, RF amplifier 135 may be used to amplify a signal between fiber node 110-*c* and end device 145-*b*. In some cases, a number or placement of RF amplifiers 135 may be based on a number of factors such as a length of coaxial cable, a type of signal being communicated on the coaxial cable, or an amount of noise associated with the signals being communicated on the coaxial cable.

Fiber node 110-*a* may be configured to direct communications for multiple industries. That is, fiber node 110-*a* may direct optical communications as well as wireless communications. For example, fiber node 110-*a* may connect base station 130 to a backhaul network (e.g., establish a wired communication between the base station 130 and the hub 105) by optical fiber 120-*c*. Alternatively, fiber node 110-*a* may connect base station 130 to a fronthaul, mid-haul or x-haul network, depending on the network configuration and/or coupling. Base station 130 has been included for explanatory purposes only and communication system 100 may include one or more base stations 130 or no base stations.

Communication system 100 may be used for point-to-point optical link based services, such as Gigabit Ethernet (e.g., used to support business services) by an AP 140. Here, an AP 140 may be in communication with a CM 125 (e.g., by Ethernet) and provide Wi-Fi connectivity for various devices. For example, the AP 140-*a* may be in communication with the CM 125-*a* and may provide Wi-Fi connectivity. Additionally or alternatively, the AP 140-*a* may be in communication with the CM 125-*b* and provide Wi-Fi connectivity to one or more end devices 145 (e.g., end device 145-*a*). The APs 140 may be integrated with a router (e.g., in a single device). In some other cases, the APs 140 may be in communication with the router (e.g., by Ethernet), where the router is in communication with the CM 125.

Network devices within the communication system 100 may be in communication with a PNM database 150. The PNM databases 150 may be cloud-based databases configured to store PNM data. In some cases, the PNM databases 150 may be specific to an MSO. For example, PNM database 150-*a* may be associated with a first MSO while PNM database 150-*b* and/or PNM database 150-*c* may be associated with a second and/or third MSO. Additionally or alternatively, one or more of the PNM databases 150 may be a same PNM database. Each PNM database 150 may store PNM data associated with one or more network devices. The PNM data may include data collected by the network device related to an operation of the network device. For example, the PNM data may include information related to a number of modulation errors detected by the network device, or other parameters related to the operation of the network device.

The network devices (e.g., an AP 140, a base station 130, and end device 145, a fiber node 110) may communicate PNM data to a PNM database 150. In some cases, the network devices may collect and communicate PNM data aperiodically (e.g., in response to a request for PNM data). In some other cases, the network devices may collect and communicate PNM data periodically. In some other cases, the network devices may collect and communicate PNM data over a time window (e.g., a day, a minute, etc.). That is, a network device within communication system 100 may collect PNM data (e.g., containing PNM data elements) and communicate the PNM data to a PNM database 150. For example, AP 140-*a* may collect Wi-Fi PNM data and transmit the PNM data to PNM database 150-*a*. In another example, base station 130 may collect data for PNM for wireless communications. In other examples, other network devices in a communication system (e.g., a CM 125, fiber node 110, end device 145) may collect PNM data and communicate the PNM data to the PNM database 150.

The performance of a network device (e.g., a fiber node 110, a CM 125, a base station 130, an AP 140, a CMTS within communication system 100) may decrease (e.g., degrade). For example, a transmission signal strength associated with the network device may decrease. In another example, a transmission delay associated with the network device may increase. In other examples, a number of errors associated with communications (e.g., received communications, transmitted communications) at the network device may increase.

A customer associated with, or in some examples using, the network device may determine (e.g., discover, notice) the decrease in performance of the network device. For example, a customer associated with AP 140-*b* (e.g., AP 140-*b* may be positioned at a home of the customer) may determine that a delay associated with the AP 140-*b* increases in the evenings. The customer may contact a vendor or an MSO associated with the network device to report the decrease in performance. The vendor or MSO may create a case identification number or other case identification data (e.g., a ticket identifier) corresponding to the network device (e.g., and indicating a MAC address of the network device) and associated with the reported decrease in performance. The vendor or MSO may attempt to troubleshoot the problem remotely but, in some cases, may send a representative to a location associated with the network device to increase (e.g., improve) the performance of the network device.

A cost associated with supporting customer service (e.g., to generate case identification data, associated cases, determine a problem associated with the network device, and execute a solution to increase the performance of the network device) may be expensive, time consuming, and inefficient. For example, representatives responsible for the customer service may not have the training or expertise to properly and/or efficiently determine a likely solution to improve the performance of the network device. In another example, representatives traveling to the location associated with the network device may not arrive prepared to address a cause of the decreased performance of the network device resulting in an inefficient and time consuming process to increase the performance of the network device.

The PNM data (e.g., stored at the PNM database 150) may be utilized to determine a predicted operation to increase the performance of the network device (e.g., a predicted solution). In some cases utilizing the PNM data to determine predicted operations to increase the performance of the network device may decrease the cost of supporting the network device. When a customer reports a network device associated with a decrease in performance, an ML engine may analyze the PNM data associated with the network device. The ML engine may generate an ordered list of predetermined operations that may increase or improve the performance of the network device. The list may be ordered according to a rank. That is, the ML engine may rank the predetermined operations according to a calculated likelihood that an execution of the predetermined operation increases the performance of the network device. In another example, the list may be ordered according to an indicated likelihood that the execution of the predetermined operation increases the performance of the network device. In either case, the list may be provided to an operator (e.g., a technician). The operator may execute one or more of the predetermined operations until determining that a performance of the network device has improved.

An ML engine analyzing PNM data associated with a network device and generating an ordered list of predetermined operations (e.g., corresponding to predicted solutions) may improve a quality of customer service, decrease a cost associated with the customer service, improve efficiency of network device repairs, or a combination thereof.

Figure 2:
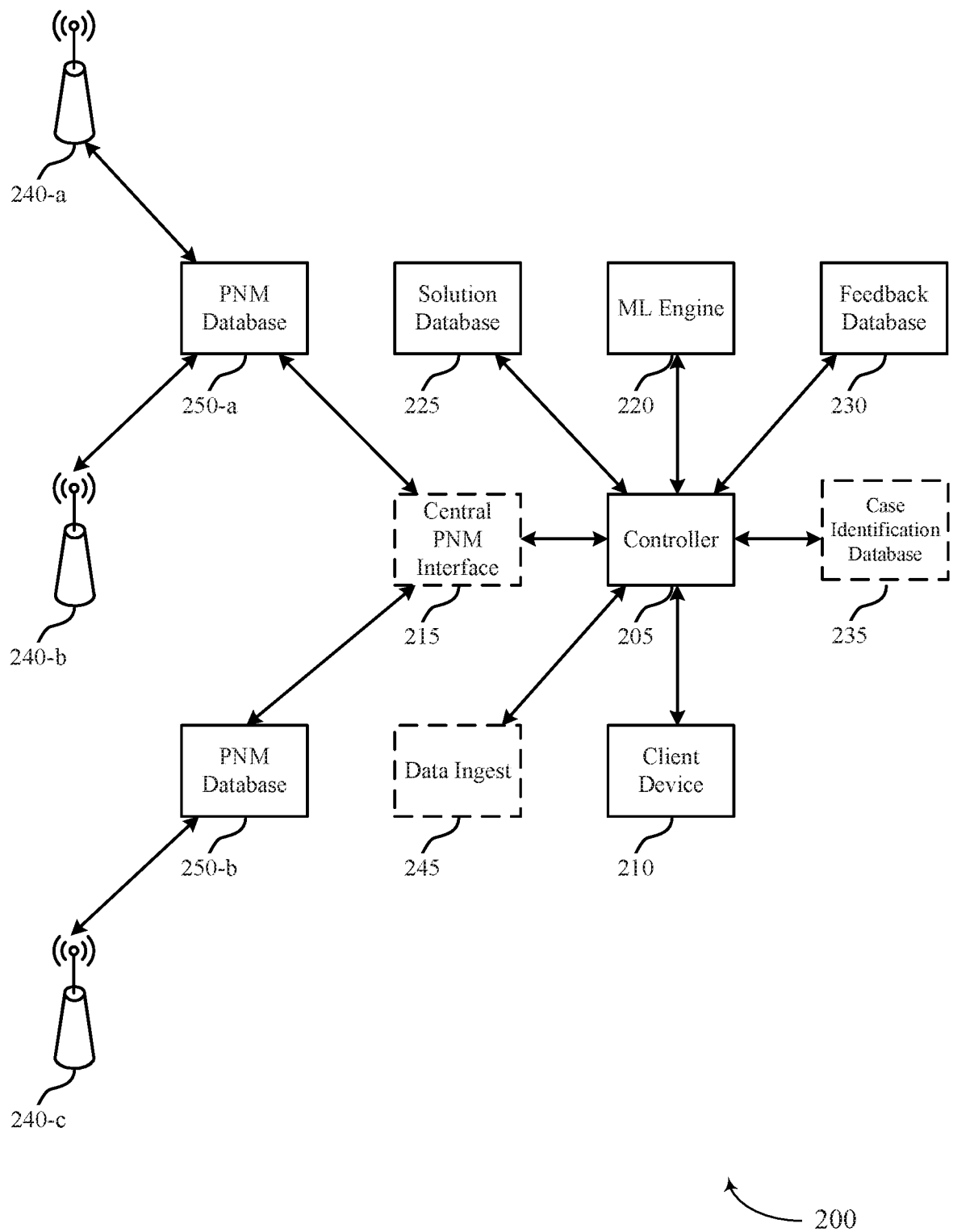

FIG. 2 illustrates an example of a communication system 200 that supports methods for network maintenance in accordance with aspects of the present disclosure. The communication system 200 may include APs 140 which may be an example of an AP as described with reference to FIG. 1. The communication system 200 may further include PNM database 250, which may be examples of PNM databases as described with reference to FIG. 1. Communication system 200 may further include a controller 205, a client device 210, a central PNM interface 215, an ML engine 220, a solution database 225, and a feedback database 230.

The controller 205 may coordinate communications between other devices within the communication system 200. For example, the controller may be an application engine. The controller 205 may coordinate communications between the client device 210, the central PNM interface 215, the ML engine 220, the solution database 225, the feedback database 230, and the case identification database 235. The controller 205 may facilitate the generation of a list of predetermined operations (e.g., by the ML engine 220) to increase the performance of a network device and the communication of the list of predetermined operations to the client device 210. In one case of communication system 200, the network device may be one of the APs 240-*a*, 240-*b*, or 240-*c*, although the network device (e.g., in other communication systems) may be a different type of device (e.g., a base station, a fiber node, a CM, a CMTS, an end device). The client device 210 may be any device (e.g., a phone, a computer, a tablet) running an application for a vendor or operator. The application may be an existing MSO application or web application.

The controller 205 may receive an indication of a decrease in performance associated with a network device. The indication of the decrease in performance may be an indication from a client device 210. For example, the client device 210 may communicate case identification data to the controller 205. The case identification data may be based on a report (e.g., from a customer associated with an AP 240). That is, a customer may have detected a decrease in performance, or an undesirable level of performance of the AP 240. The customer may contact a representative, which may be a vendor or MSO associated with the AP 240. The representative may open a case (e.g., a trouble ticket) for the AP 240 and assign case identification data unique to the case. The vendor or operator may communicate the case identification data to the controller 205 by the client device 210. Communicating the case identification data (e.g., as opposed to a MAC address of the AP 240) may increase a security and privacy associated with the communications. By communicating the case identification data to the controller 205, the vendor or operator may initiate a process to receive an ordered set of predetermined operations to increase the performance of the AP 240.

The controller 205 may request PNM data for the AP 240 associated with the case identification data. In some cases, the controller 205 may transmit the case identification data to a central PNM interface 215 to request the PNM data. The central PNM interface 215 may be an interface to the various PNM databases 250 (e.g., the various MSO PNM systems). In some cases, the central PNM interface 215 may access a record of the case corresponding to the case identification data. The central PNM interface 215 may determine a MAC address of the network device associated with the case identification data. For example, if the case identification data relates to AP 240-*a*, the central PNM interface 215 may receive the case identification data and determine a MAC address for AP 240-*a*.

The central PNM interface 215 may determine which of the PNM databases 250 corresponds to the AP associated with the case identification data. For example, if the case identification data is associated with AP 240-*b*, the central PNM interface 215 may determine that PNM database 250-*a* corresponds to AP 240-*b*. The central PNM interface 215 may transmit the AP MAC address to the appropriate PNM database 250.

Additionally or alternatively, the controller 205 may communicate the case identification data to the case identification database 235 (e.g., an MSO ticket database). The case identification database 235 may access a record of the case corresponding to the case identification data. The case identification database 235 may determine a MAC address of the network device associated with the case identification data. For example, if the case identification data relates to AP 240-c, the case identification database 235 may receive the case identification data and determine a MAC address for AP 240-c. The case identification database 235 may communicate the MAC address for the relevant AP. The case identification database 235 may further communicate a description of the problem to the controller 205. The controller 205 may communicate the problem description for display at the client device 210. This may provide additional information to the vendor or operator. The controller 205 may determine which of the PNM databases 250 corresponds to the AP associated with the case identification data. The controller 205 may transmit the AP MAC address to the appropriate PNM database 250 (e.g., bypassing the central PNM interface 215 in some cases). Additionally or alternatively, the controller 205 may transmit the AP MAC address to the central PNM interface 215. The central PNM interface 215 may forward the AP MAC address to the appropriate PNM database 250.

The PNM database may receive the AP MAC address and transmit the PNM data to the central PNM interface 215 or the controller 205. In some cases, the PNM database 250 may communicate the PNM data to the central PNM interface 215. The central PNM interface 215 may forward the PNM data to the controller 205. The PNM data (e.g., associated with the AP 240 indicated by the case identification data) may be in a raw data format. The controller 205 may transform the PNM data into a different format (e.g., usable by the ML engine 220). In some cases, the controller 205 may transform the data at the controller 205. In some other cases, the controller 205 may communicate the PNM data in a raw format to data ingest 245. The data ingest 245 may be a cloud data flow. The data ingest 245 may transform the PNM data into the format usable by the ML engine 220 and communicate the reformatted PNM data to the controller 205.

The controller 205 may communicate the reformatted PNM data to the ML engine 220. The ML engine 220 may be an artificial intelligence (AI) based PNM advisor. The ML engine 220 may be pretrained based on known symptoms and resolutions. For example, past PNM data corresponding to an AP 240 with a decreased level of performance and the operations that improved the AP 240 performance may be supplied to the ML engine 220. Based on the data, the ML engine 220 may correlate PNM data patterns with predetermined solutions. In some cases, the ML engine 220 may also be pretrained to recognize a source of the decreased performance of the AP 240. The ML engine 220 may be a machine learning model that accepts PNM data as an input and returns indications of predetermined operations (e.g., solutions to increase the performance of the APs 240) and a probability associated with each predetermined operation indicating a likelihood that the predetermined operation increases the performance of the AP 240. In some cases, the ML engine 220 may also return a predicted source of the decreased AP 240 performance to the controller 205.

The controller 205 may receive the indication of a list of predetermined operations. The indications of the predetermined operations may include one or more indices. The controller 205 may communicate the indices to the solution database 225. The solution database 225 may map each index (e.g., a column index) to solution text. The solution text may be text describing the predetermined operation. For example, a column index of 32 (e.g., received by the controller 205 from the ML engine 220) may correspond to the solution text "Change an operation channel." The controller 205 may communicate each of the predetermined operations (e.g., the solution text) to the client device 210. The client device 210 may display an ordered list of the predetermined operations. For example, the controller 205 may communicate five predetermined operations (and corresponding probabilities) to improve the performance of an AP 240. The client device 210 may display a predetermined operation associated with a highest probability first. In some cases, the controller 205 may communicate the predicted source of the decreased AP 240 performance to the client device 210 for display as well.

An operator or vendor may view the list displayed at the client device 210 and perform one or more of the predetermined operations. For example, the operator or vendor may perform the first predetermined operation. The operator or vendor may determine if, after performing the predetermined operation, the performance of the AP 240 improves. Additionally or alternatively, the operator or vendor may request for the controller 205 to determine whether the performance of the AP 240 improved. The controller 205 may request, by the central PNM interface 215, second PNM data associated with the AP 240. The controller 205 or the ML engine 220 may compare the PNM data requested in response to the case identification data to the second PNM data to determine whether the execution of the predetermined operation increased the performance of the AP 240. If the performance increases, the operator or vendor may provide feedback by the client device 210. The feedback may indicate the predetermined operation performed as well as the success (e.g., the improved performance) as a result of performing the predetermined operation.

If the operator or vendor determines that the performance of the AP 240 does not improve (e.g., remains the same) the operator or vendor may perform the second predetermined operation. The operator or vendor may continue to perform the predetermined operations in order until the performance of the AP 240 improves. The operator or vendor may provide feedback by the client device 210 indicating which of the predetermined operations was successful (e.g., resulted in an increased performance of the AP 240).

The operator or vendor may perform each of the predetermined operations and determine that the performance of the AP 240 has not increased (e.g., remained the same). The operator or vendor may then troubleshoot the AP 240 himself. The operator or vendor may perform an operation (e.g., not included in the list of predetermined operations) that results in an improved performance at the AP 240. The operator may provide an indication of the operation that results in the improved performance at the AP 240 to the controller 205 (e.g., by the client device 210) resulting in the improved performance by the client device 210. In some cases, each operator or vendor may be associated with a reliability index indicating a reliability (e.g., a predicted accuracy) of the feedback from the operator or vendor. For example, an operator or vendor that provides feedback that is historically correct may be associated with a higher reliability index than an operator or vendor that provides little feedback or feedback that is not historically correct.

The client device 210 may receive the feedback indicating the operation (e.g., a predetermined operation or an operation not included in the list of predetermined operations) resulting in an increased performance at the AP 240 to the controller 205. The controller 205 may communicate the feedback to the feedback database 230 and/or the ML engine 220. The controller 205 may communicate feedback relating to the predetermined operations to the ML engine 220 (e.g., feedback indicating which, if any, of the predetermined operation increased the AP 240 performance). The ML engine 220 may utilize the feedback to improve future lists of predetermined operations provided based on the PNM data. For example, if the feedback indicates that the third predetermined operation resulted in an increased AP 240 performance, the ML engine 220 may incorporate the feedback and provide a higher probability metric associated with the predetermined operation in the future.

The controller 205 may communicate feedback indicating a different operation (e.g., not included in the list of predetermined operations) to the feedback database 230. The feedback database 230 may evaluate the different operation to determine if the different operation is similar to a predetermined operation known by the ML engine. For example, if the different operation corresponds to "restarting the AP," the feedback database 230 (e.g., by natural language processing) may determine that the different operation is similar to a predetermined operation corresponding to an "AP restart." Here, the feedback database 230 may adjust a probability metric of the "AP restart" based on the feedback. In some other cases, the feedback database 230 may determine that the different operation is a novel operation (e.g., different than the predetermined operations). Here, the feedback database 230 may provide an indication of the novel operation to an MSO or vendor (e.g., by a client device 210). Based on the feedback, the ML engine 220 may be updated to include the novel operation as a predetermined operation in the future.

In some cases, the ML engine 220 may be updated based on the reliability index of the vendor or operator providing the feedback. For example, the ML engine 220 may not update if the feedback is provided from an operator or vendor with a relatively low reliability index. Additionally or alternatively, the ML engine 220 may update if the feedback is provided from an operator or vendor with a relatively high reliability index. This may decrease a likelihood that the ML engine 220 updates based on incorrect feedback.

In some cases, the controller 205 may automate the execution of the predetermined operations. For example, the controller 205 may receive an indication of three predetermined operations from the ML engine 220. The controller 205 may reference a database (e.g., a command database) correlating an index received from the ML engine to a command to be executed at the AP 240 to perform the predetermined operation. For example, the predetermined operation may indicate for an operating channel of the AP 240 to be changed, for the AP 240 to be restarted, or for the AP 240 transmission power to be increased. The controller 205 may issue a command to the AP 240 (e.g., remotely) to initiate the execution of the predetermined operation. After the execution of each command, the controller 205 may request, by the central PNM interface 215, second PNM data associated with the AP 240. The controller 205 or the ML engine 220 may compare the PNM data requested in response to the case identification data to the second PNM data to determine whether the execution of the command at the AP 240 increased the performance of the AP 240.

Figure 3:
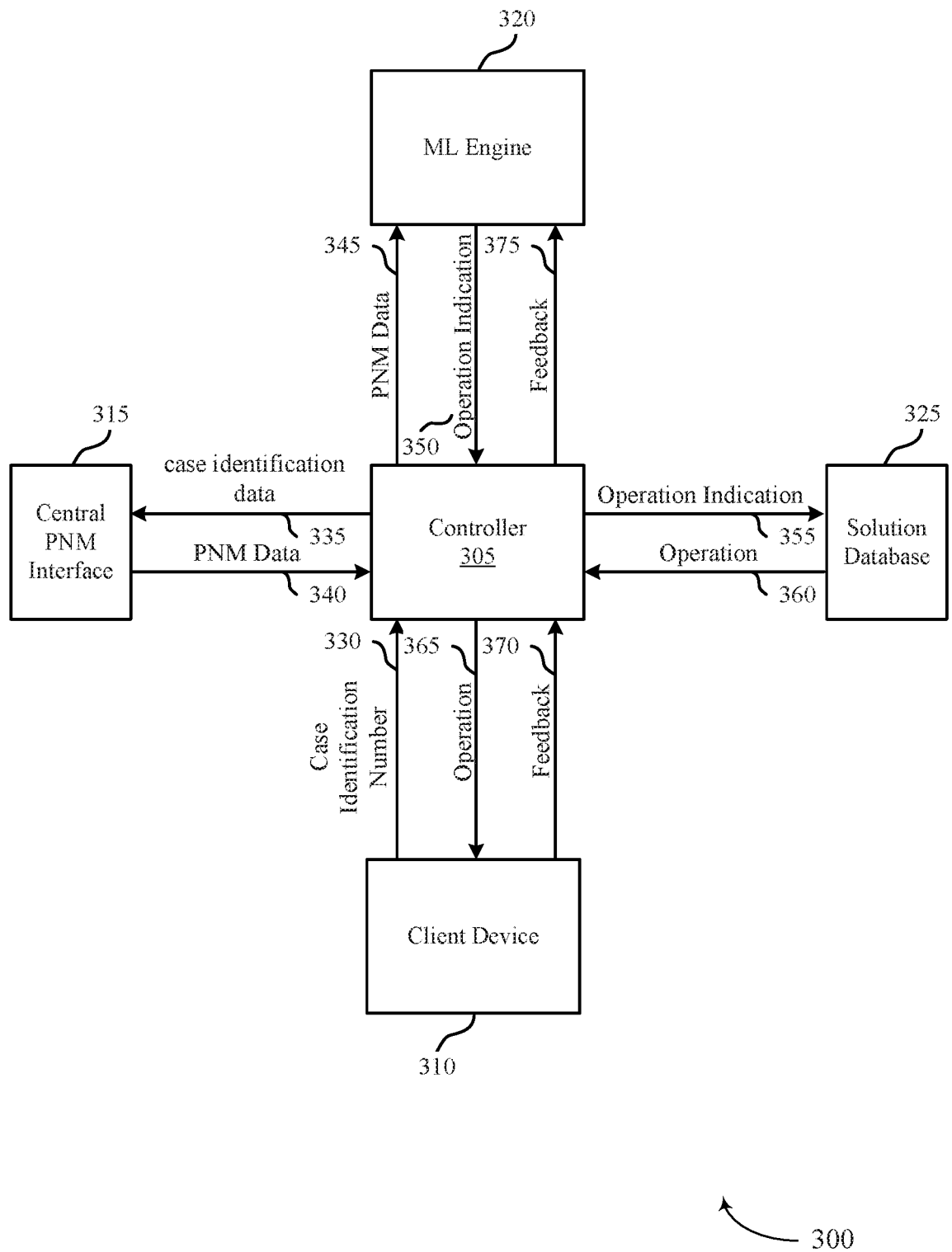
FIGS. 3 through 5 illustrate examples of process flows that support methods for network maintenance in accordance with aspects of the present disclosure.

FIG. 3 illustrates an example of a process flow 300 that supports methods for network maintenance in accordance with aspects of the present disclosure. The process flow 300 may include communications performed by a controller 305, client device 310, central PNM interface 315, ML engine 320, and solution database 325, which may be an example of corresponding devices as described with reference to FIGS. 1 and 2.

At 330, the client device 310 may transmit case identification data to the controller 305 number associated with a network device. The case identification data may correspond to a ticket identifier generated based on a user (e.g., a customer) of the network device reporting a degraded performance of the network device. The client device may correspond to a device connected to the network. In some cases, the client device may provide a user interface (e.g., a graphical user interface (GUI), a menu-driven interface) to an operator (e.g., a technician) attempting to increase or improve the performance of the network device.

At 335, the controller 305 may transmit, to the central PNM interface 315, the case identification data associated with the network device based on receiving the case identification data from the client device 310. Additionally or alternatively, the controller 305 may determine a MAC address associated with the network device (e.g., based on the case identification data) and transmit the MAC address to the central PNM interface 315.

At 340, the central PNM interface 315 may transmit PNM data to the controller 305. PNM data may be associated with the network device. In some cases, the central PNM interface 315 may receive the PNM data from a PNM database and forward the PNM data to the controller 305 at 340.

At 345, the controller 305 may transmit the PNM data to the ML engine 320. The controller 305 may transmit the PNM data to the ML engine 320 based on receiving the case identification data from the client device 310.

At 350, the ML engine 320 may transmit an indication of a predetermined operation predicted to impact a performance of the network device. In some cases, the ML engine 320 may transmit a set of indications of predetermined operations to the controller 305. The ML engine 320 may determine the predetermined operation (or operations) to indicate to the controller 305 based on the PNM data. For example, the ML engine 320 may analyze past PNM data and associated operations performed resulting in improved performance at the network device to determine one or more predetermined operations that may improve the performance of the network device.

In some cases, at 350 the ML engine 320 may also transmit prioritization data to the controller 305. The prioritization data may be associated with each of the set of predetermined operations and may indicate a recommended order for implementing each of the set of predetermined operations. The prioritization data may be based on a likelihood (e.g., calculated by the ML engine 320) that the predetermined operation improves the performance of the network device.

At 355, the controller 305 may optionally transmit one or more indications of the predetermined operations to the solution database 325. The indication of the predetermined operation may be an index associated with the solution database 325. The solution database 325 may be a text database. The solution database 325 may reference the text according to the index to determine the predetermined operation. At 360, the solution database 325 may transmit the predetermined operation to the controller 305.

At 365, the controller 305 may transmit the predetermined operation to the client device 310. In some cases, the controller 305 may transmit a set of predetermined operations to the client device 310 (e.g., in a case that the ML engine communicated a set of operation indications to the controller 305 at 350). The client device 310 may display the predetermined operations according to the prioritization data (e.g., in the order indicated by the prioritization data). An operator or vendor (e.g., a technician) may execute the predetermined operations in the order until determining the performance of the network device improves.

At 370, the client device may optionally transmit feedback to the controller 305. The feedback may indicate whether the performance of the network device increases after the implementation of the predetermined operation. In some other cases, the feedback may indicate an operation not included in the set of operations that increases the performance of the network device.

At 375, the controller 305 may transmit the feedback to the ML engine 320. In some cases the feedback may be based on the controller determining whether the performance of the network device increases after an implementation of the predetermined operation. For example, the controller 305 may request a second set of PNM data associated with the network device (e.g., from the central PNM interface 315). The central PNM interface may transmit the second PNM data to the controller 305. The controller 305 (or, in some cases, the ML engine 320) may determine whether the performance of the network device increases based on comparing the second PNM data to the initial PNM data (e.g., corresponding to the PNM data transmitted at 340). In some other cases, the feedback (e.g., transmitted to the ML engine at 320) may be based on the feedback received from the client device at 370.

The ML engine 320 may adapt the training data (e.g., used to generate the predetermined operations and corresponding prioritization data) based on the feedback received at 375.

Figure 4:
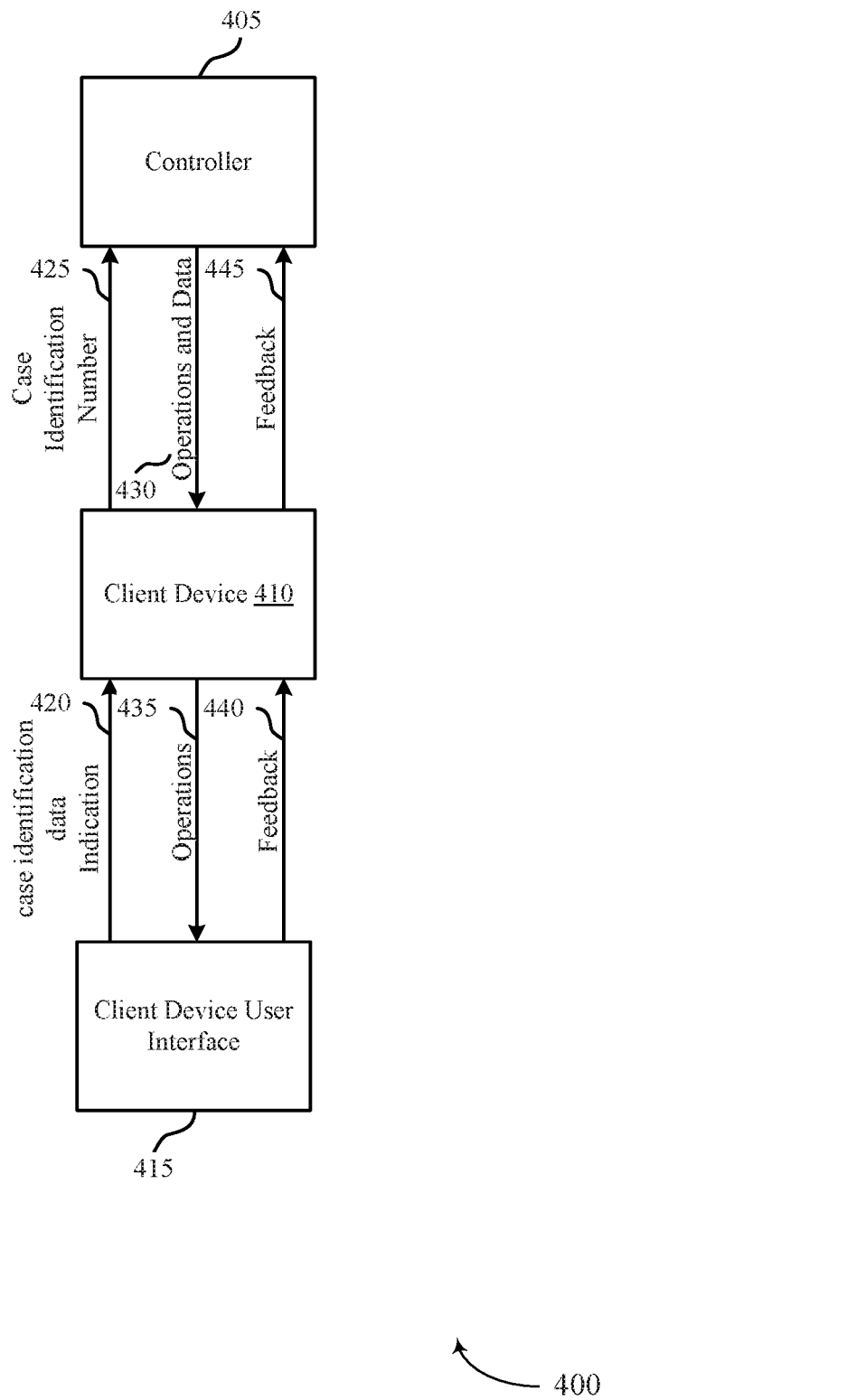

FIG. 4 illustrates an example of a process flow 400 that supports methods for network maintenance in accordance with aspects of the present disclosure. The process flow 400 may include communications performed by a controller 405 and client device 410, which may be an example of corresponding devices as described with reference to FIGS. 1, 2, and 3. The process flow 400 may further include a client device user interface 415. The client device user interface 415 may be a user interface (e.g., a GUI) associated with the client device 410. For example, the client device user interface 415 may enable a user (e.g., a vendor, an operator, a representative) to provide information (e.g., case identification data) to the client device 410 or receive information from the client device 410.

At 420, the client device user interface 415 may indicate, to the client device 410, case identification data associated with a network device. At 425, the client device 410 may transmit the case identification data to the controller 405 based on receiving the indication from the client device user interface 415.

At 430 the controller 405 may transmit, to the client device 410, a set of predetermined operations predicted to impact the performance of the network device. In some cases, the controller 405 may transmit prioritization data corresponding to each of the set of predetermined operations. The prioritization data may indicate a recommended order for implementing each of the set of predetermined operations.

At 435, the client device 410 may transmit the set of predetermined operations to the client device user interface 415 for display. The client device user interface 415 may display the predetermined operations according to a likelihood that the predetermined operation impacts the performance of the network device.

At 440, the client device 410 may receive feedback by the client device user interface 415 based on communication the set of predetermined operations to the client device user interface 415 for display. The feedback may include a second indication that one of the set of predetermined operations improves the performance of the network device. In some other cases, the feedback may include an alternative operation (e.g., not included in the set of predetermined operations) that improved the performance of the network device.

At 445, the client device 410 may transmit feedback to the controller. In some cases, the client device 410 may forward the feedback received by the client device user interface 415 to the controller 405.

Figure 5:
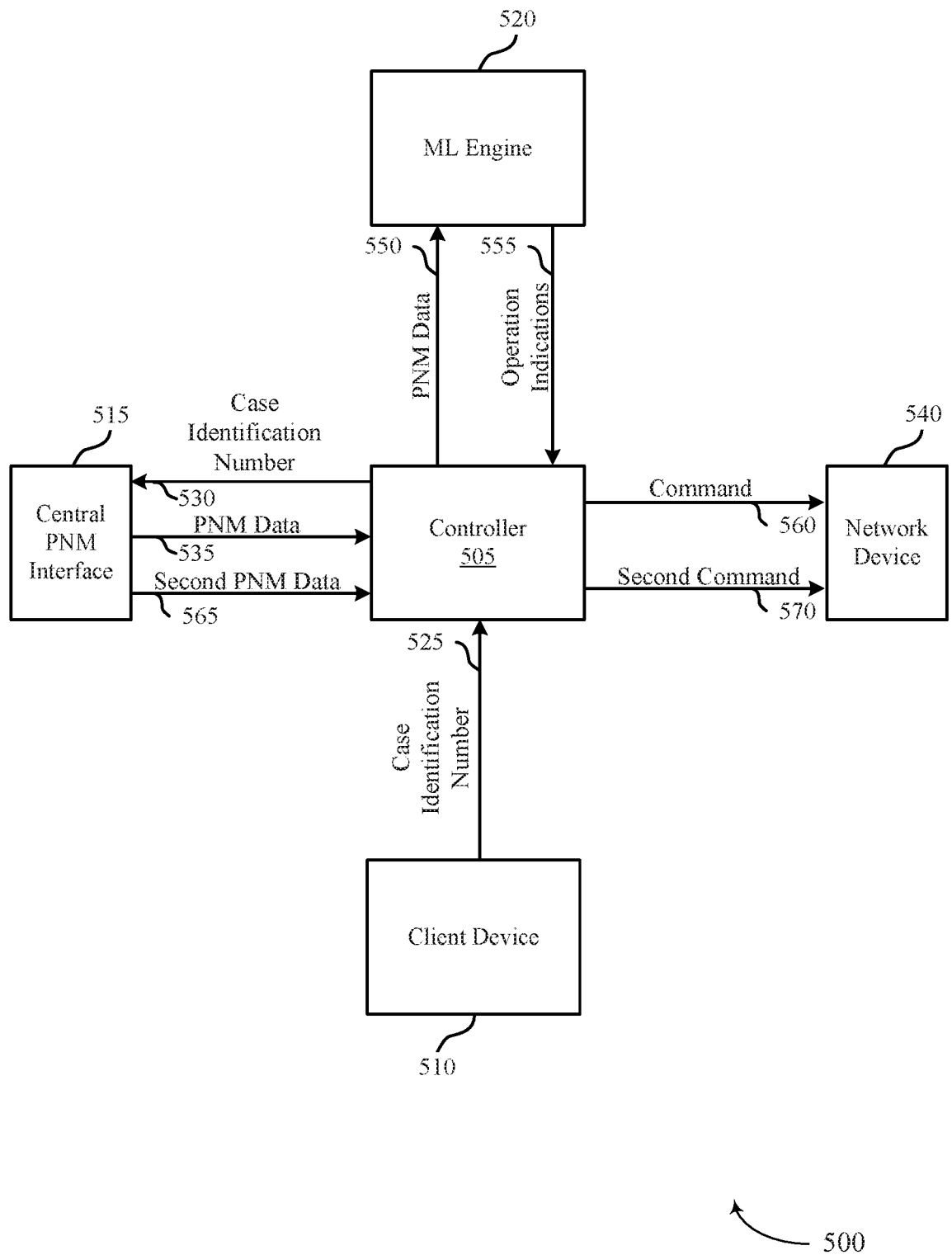

FIG. 5 illustrates an example of a process flow 500 that supports methods for network maintenance in accordance with aspects of the present disclosure. The process flow 500 may include communications performed by a controller 505, client device 510, central PNM interface 515, ML engine 520, and network device 540, which may be an example of corresponding devices as described with reference to FIGS. 1 through 4.

At 525, the client device 510 may transmit case identification data associated with the network device 540 to the controller 505.

At 530, the controller 305 may transmit, to the central PNM interface 515, the case identification data associated with the network device 540 based on receiving the case identification data from the client device 510. Additionally or alternatively, the controller 505 may determine a MAC address associated with the network device 540 (e.g., based on the case identification data) and transmit the MAC address to the central PNM interface 515.

At 535, the central PNM interface 515 may transmit PNM data to the controller 505. The PNM data may be associated with the network device 540. In some cases, the central PNM interface 515 may receive the PNM data from a PNM database and forward the PNM data to the controller 505 at 535.

At 550, the controller 505 may transmit, to the ML engine 520, PNM data associated with network device 540 based on receiving the case identification data.

At 555, the ML engine 520 may transmit an indication of a plurality of predetermined operations predicted to impact a performance of the network device 540.

At 560, the controller 505 may transmit, to the network device 540, a command associated with a first predetermined operation of the plurality of predetermined operations. The network device 540 may execute the command and initiate the first predetermined operation at the network device 540.

At 565, the controller 505 may receive, from the central PNM interface 515, second PNM data after the execution of the command at the network device 540. The controller 505 (or, in some cases, the ML engine 520) may compare the PNM data received at 535 to the second PNM data received at 565 to determine whether the performance of the network device 540 increases after the execution of the command.

At 570, the controller 505 may optionally transmit a second command to the network device 540. For example, the controller 505 may determine that the performance of the network device 540 is substantially the same as the performance of the network device 540 prior to the execution of the command.

Figure 6:
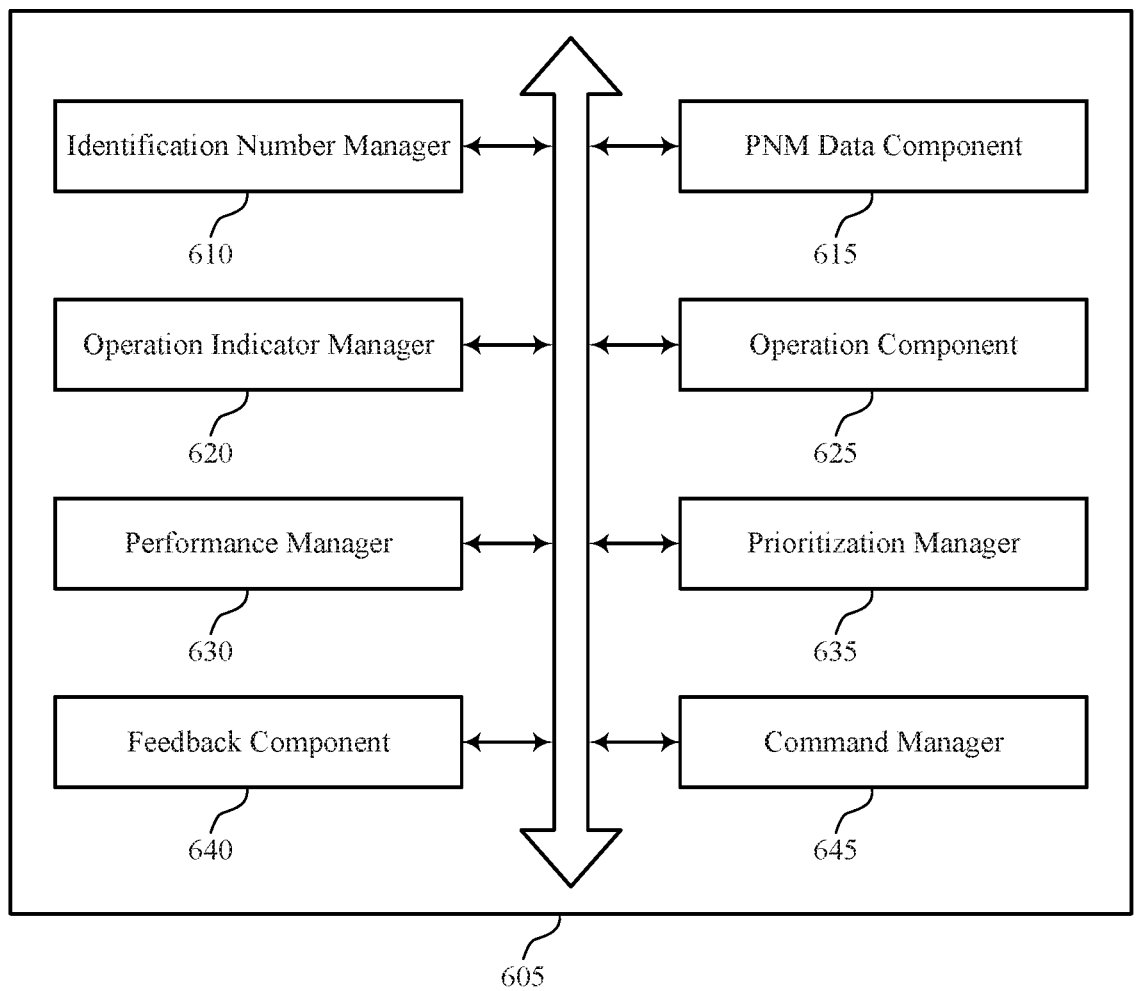
FIG. 6 shows a block diagram of a controller that supports methods for network maintenance in accordance with aspects of the present disclosure.

FIG. 6 shows a block diagram 600 of a controller 605 that supports methods for network maintenance in accordance with aspects of the present disclosure. The controller 605 may be an example of aspects of a controller as described with reference to FIGS. 2 through 5. The controller 605 may include an identification number manager 610, a PNM data component 615, an operation indicator manager 620, an operation component 625, a performance manager 630, a prioritization manager 635, a feedback component 640, and a command manager 645. Each of these modules may communicate, directly or indirectly, with one another (e.g., via one or more buses).

The identification number manager 610 may receive, from a client device, case identification data associated with a network device. In some cases, the case identification data corresponds to a report associated with the network device. In some instances, the network device corresponds to an AP. In some cases, the client device corresponds to a device connected to the network and used by an operator. In some examples, the identification number manager 610 may transmit, to an interface, the case identification data associated with the network device based on receiving the case identification data from the client device. In some examples, the identification number manager 610 may receive, from the client device, a second case identification data different than the case identification data, the second case identification data associated with a second network device, where receiving the second case identification data occurs after transmitting the second indication of whether the performance of the network device increases after the implementation of the predetermined operation.

The PNM data component 615 may transmit, to an ML engine, PNM data associated with the network device based on receiving the case identification data. In some examples, the PNM data component 615 may receive, from the interface, the PNM data associated with the network device, where transmitting the PNM data to the ML engine is based on receiving the PNM data from the interface. In some instances, the PNM data component 615 may transmit, to the ML engine, PNM data associated with the second network device based on receiving the second case identification data. In some cases, the PNM data component 615 may receive second PNM data associated with the network device after transmitting the predetermined operation to the client device. In some examples, the PNM data component 615 may receive, from an interface, second PNM data after the execution of the command at the network device.

The operation indicator manager 620 may receive, from the ML engine, an indication of a predetermined operation predicted to impact a performance of the network device. In some examples, the identification number manager 620 may receive a set of indications of predetermined operations predicted to impact the performance of the network device from the ML engine, the set of indications including at least the indication of the predetermined operation. In some cases, the operation indicator manager 620 may receive, from the ML engine, a third indication of a predetermined operation predicted to impact the performance of the second network device, where the third indication of the predetermined operation is based on transmitting the second indication of whether the performance of the network device increases.

The operation component 625 may transmit the predetermined operation to the client device based on receiving the indication of the predetermined operation. In some examples, the operation component 625 may determine the predetermined operation based on text indicated by the index, where transmitting the predetermined operation is based on the determining the predetermined operation. In some cases, the operation component 625 may reference the text database according to the index.

The performance manager 630 may determine whether the performance of the network device increases after an implementation of the predetermined operation. Determining whether the performance of the network device increases after the implementation of the predetermined operation may be based on a comparison of the PNM data and the second PNM data. In some examples, the performance manager 630 may receive, from the client device, the second indication of whether the performance of the network device increases after the implementation of the predetermined operation, where determining whether the performance of the network device increases is based on receiving the second indication from the client device. In some cases, the performance manager 630 may transmit, to the ML engine, a second indication of whether the performance of the network device increases after the implementation of the predetermined operation.

In some examples, the performance manager 630 may determine whether the performance of the network device increases after the execution of the command at the network device based on a comparison of the second PNM data and the PNM data. In some examples, the performance manager 630 may determine that the performance of the network device is substantially the same as the performance of the network device prior to the execution of the command based on determining whether the performance of the network device increases after the execution of the command at the network device.

The prioritization manager 635 may receive prioritization data associated with each of a set of predetermined operations indicated by the set of indications, where the prioritization data indicates a recommended order for implementing each of the set of predetermined operations based on a likelihood that implementing the predetermined operation increases the performance of the network device.

The feedback component 640 may receive, from the client device, an operation different than the predetermined operation that improved the performance of the network device. In some examples, the feedback component 640 may transmit, to the ML engine, the operation received from the client device.

The command manager 645 may transmit, to the network device, a command associated with a first predetermined operation of the set of predetermined operations, where an execution of the command initiates the first predetermined operation at the network device. In some examples, the command manager 645 may transmit, to the network device, a second command associated with a second predetermined operation of the set of predetermined operations, where an execution of the second command initiates the second predetermined operation at the network device. In some cases, the command to the network device indicates for the network device to restart the network device, change a configuration of the network device, or both.

Figure 7:
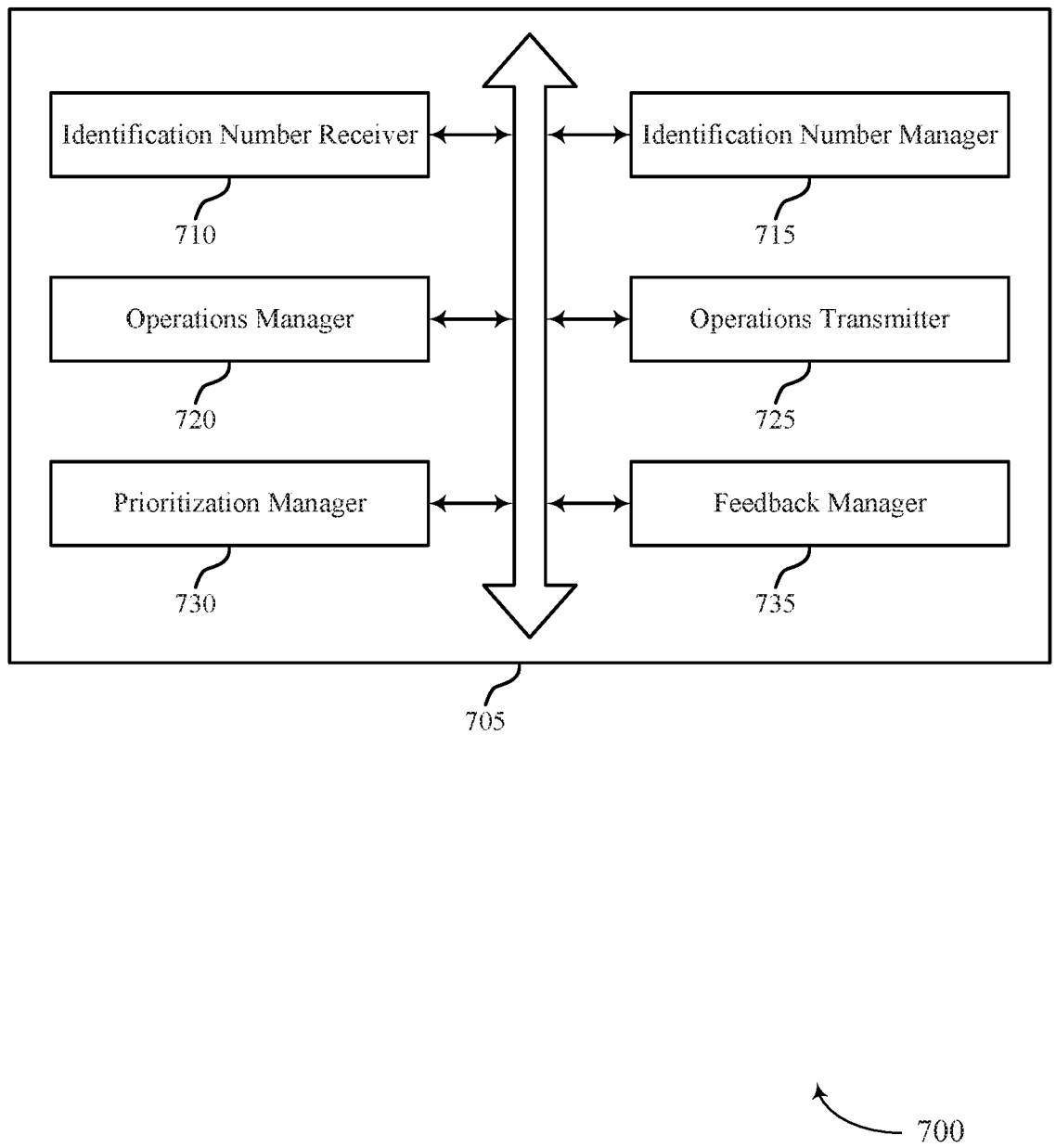
FIG. 7 shows a block diagram of a client device that supports methods for network maintenance in accordance with aspects of the present disclosure.

FIG. 7 shows a block diagram 700 of a client device 705 that supports methods for network maintenance in accordance with aspects of the present disclosure. The client device 705 may be an example of aspects of a client device as described with reference to FIGS. 2 through 5. The client device 705 may include an identification number receiver 710, an identification number manager 715, an operations manager 720, an operations transmitter 725, a prioritization manager 730, and a feedback manager 735. Each of these modules may communicate, directly or indirectly, with one another (e.g., via one or more buses).

The identification number receiver 710 may receive, from a user interface associated with a client device, an indication of case identification data associated with a network device.

The identification number manager 715 may transmit the case identification data to a controller based on receiving the indication of the case identification data.

The operations manager 720 may receive, from the controller, a set of predetermined operations predicted to impact a performance of the network device.

The operations transmitter 725 may communicate the set of predetermined operations to the user interface for display according to a likelihood that the predetermined operation impacts the performance of the network device.

The prioritization manager 730 may receive, from the controller, prioritization data corresponding to each of the set of predetermined operations, the prioritization data indicating a recommended order for implementing each of the set of predetermined operations.

In some examples, the prioritization manager 730 may order each of the indicated predetermined operations based on the prioritization data, where communicating the set of predetermined operations to the user interface is based on the ordering.

The feedback manager 735 may receive a second indication, from the user interface, that one of the set of predetermined operations improves the performance of the network device, where receiving the second indication is based on communicating the set of predetermined operations to the user interface.

In some examples, the feedback manager 735 may transmit the second indication that one of the set of predetermined operations improves the performance of the network device to the controller.

In some examples, the feedback manager 735 may receive, from the user interface, an operation different than the set of predetermined operations that improved the performance of the network device.

In some examples, the feedback manager 735 may transmit the operation different than the set of predetermined operations to the controller.

Figure 8:
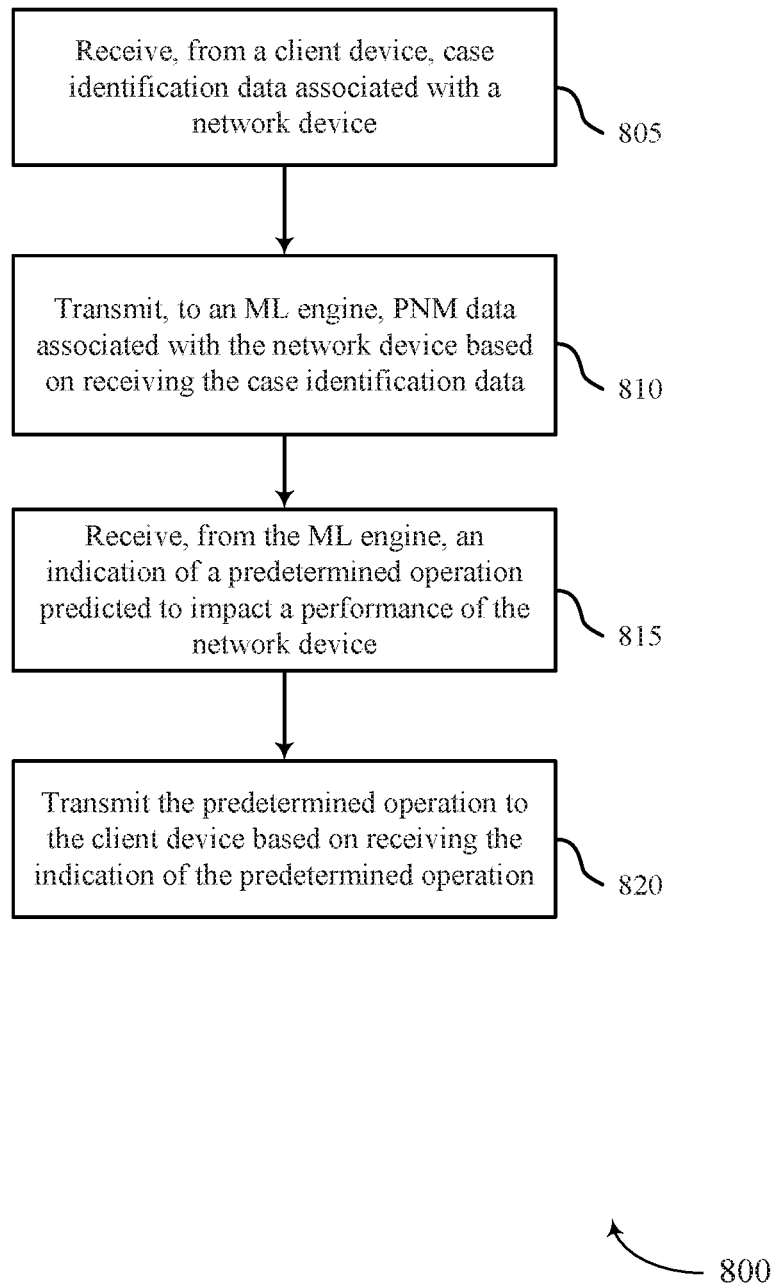
FIGS. 8 through 11 show flowcharts illustrating methods that support methods for network maintenance in accordance with aspects of the present disclosure.

FIG. 8 shows a flowchart illustrating a method 800 that supports methods for network maintenance in accordance with aspects of the present disclosure. The operations of method 800 may be implemented by a controller or its components as described herein. In some examples, a controller may execute a set of instructions to control the functional elements of the controller to perform the described functions. Additionally or alternatively, a controller may perform aspects of the described functions using special-purpose hardware.

At 805, the controller may receive, from a client device, case identification data associated with a network device. The operations of 805 may be performed according to the methods described herein. In some examples, aspects of the operations of 805 may be performed by an identification number manager as described with reference to FIG. 6.

At 810, the controller may transmit, to an ML engine, PNM data associated with the network device based on receiving the case identification data. The operations of 810 may be performed according to the methods described herein. In some examples, aspects of the operations of 810 may be performed by a PNM data component as described with reference to FIG. 6.

At 815, the controller may receive, from the ML engine, an indication of a predetermined operation predicted to impact a performance of the network device. The operations of 815 may be performed according to the methods described herein. In some examples, aspects of the operations of 815 may be performed by an operation indicator manager as described with reference to FIG. 6.

At 820, the controller may transmit the predetermined operation to the client device based on receiving the indication of the predetermined operation. The operations of 820 may be performed according to the methods described herein. In some examples, aspects of the operations of 820 may be performed by an operation component as described with reference to FIG. 6.

Figure 9:
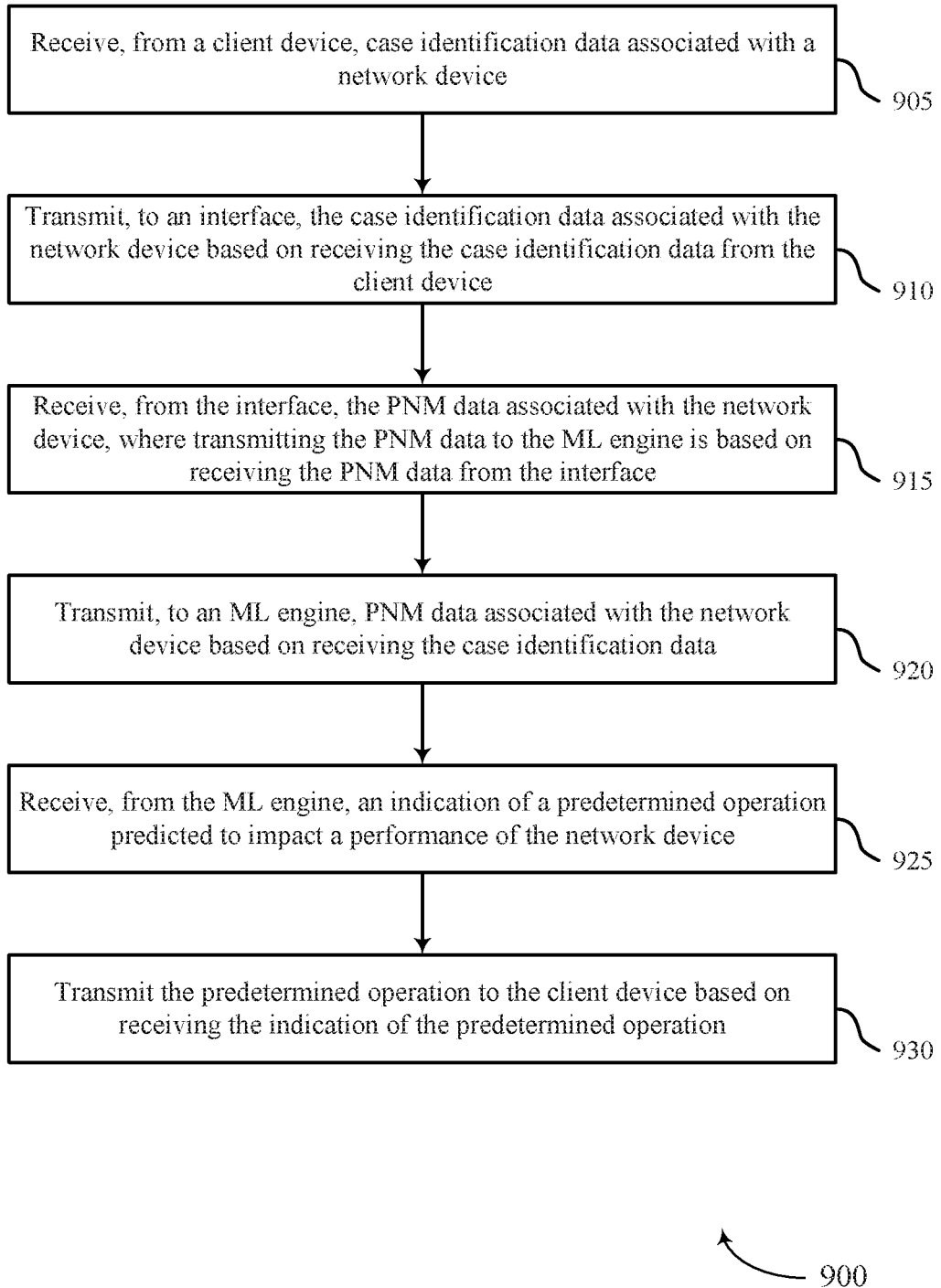

FIG. 9 shows a flowchart illustrating a method 900 that supports methods for network maintenance in accordance with aspects of the present disclosure. The operations of method 900 may be implemented by a controller or its components as described herein. In some examples, a controller may execute a set of instructions to control the functional elements of the controller to perform the described functions. Additionally or alternatively, a controller may perform aspects of the described functions using special-purpose hardware.

At 905, the controller may receive, from a client device, case identification data associated with a network device. The operations of 905 may be performed according to the methods described herein. In some examples, aspects of the operations of 905 may be performed by an identification number manager as described with reference to FIG. 6.

At 910, the controller may transmit, to an interface, the case identification data associated with the network device based on receiving the case identification data from the client device. The operations of 910 may be performed according to the methods described herein. In some examples, aspects of the operations of 910 may be performed by an identification number manager as described with reference to FIG. 6.

At 915, the controller may receive, from the interface, the PNM data associated with the network device, where transmitting the PNM data to the ML engine is based on receiving the PNM data from the interface. The operations of 915 may be performed according to the methods described herein. In some examples, aspects of the operations of 915 may be performed by a PNM data component as described with reference to FIG. 6.

At 920, the controller may transmit, to an ML engine, PNM data associated with the network device based on receiving the case identification data. The operations of 920 may be performed according to the methods described herein. In some examples, aspects of the operations of 920 may be performed by a PNM data component as described with reference to FIG. 6.

At 925, the controller may receive, from the ML engine, an indication of a predetermined operation predicted to impact a performance of the network device. The operations of 925 may be performed according to the methods described herein. In some examples, aspects of the operations of 925 may be performed by an operation indicator manager as described with reference to FIG. 6.

At 930, the controller may transmit the predetermined operation to the client device based on receiving the indication of the predetermined operation. The operations of 930 may be performed according to the methods described herein. In some examples, aspects of the operations of 930 may be performed by an operation component as described with reference to FIG. 6.

Figure 10:
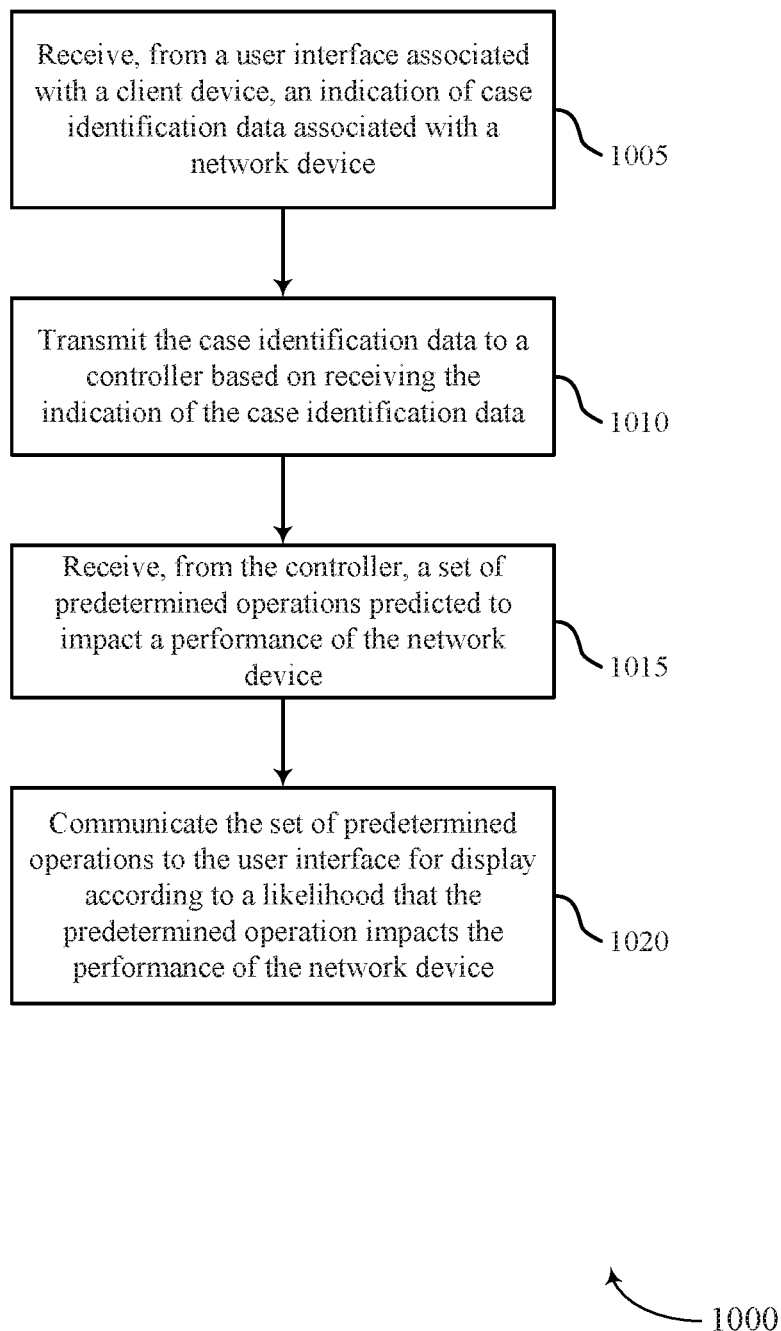

FIG. 10 shows a flowchart illustrating a method 1000 that supports methods for network maintenance in accordance with aspects of the present disclosure. The operations of method 1000 may be implemented by a client device or its components as described herein. In some examples, a client device may execute a set of instructions to control the functional elements of the client device to perform the described functions. Additionally or alternatively, a client device may perform aspects of the described functions using special-purpose hardware.

At 1005, the client device may receive, from a user interface associated with a client device, an indication of case identification data associated with a network device. The operations of 1005 may be performed according to the methods described herein. In some examples, aspects of the operations of 1005 may be performed by an identification number receiver as described with reference to FIG. 7.

At 1010, the client device may transmit the case identification data to a controller based on receiving the indication of the case identification data. The operations of 1010 may be performed according to the methods described herein. In some examples, aspects of the operations of 1010 may be performed by an identification number manager as described with reference to FIG. 7.

At 1015, the client device may receive, from the controller, a set of predetermined operations predicted to impact a performance of the network device. The operations of 1015 may be performed according to the methods described herein. In some examples, aspects of the operations of 1015 may be performed by an operations manager as described with reference to FIG. 7.

At 1020, the client device may communicate the set of predetermined operations to the user interface for display according to a likelihood that the predetermined operation impacts the performance of the network device. The operations of 1020 may be performed according to the methods described herein. In some examples, aspects of the operations of 1020 may be performed by an operations transmitter as described with reference to FIG. 7.

Figure 11:
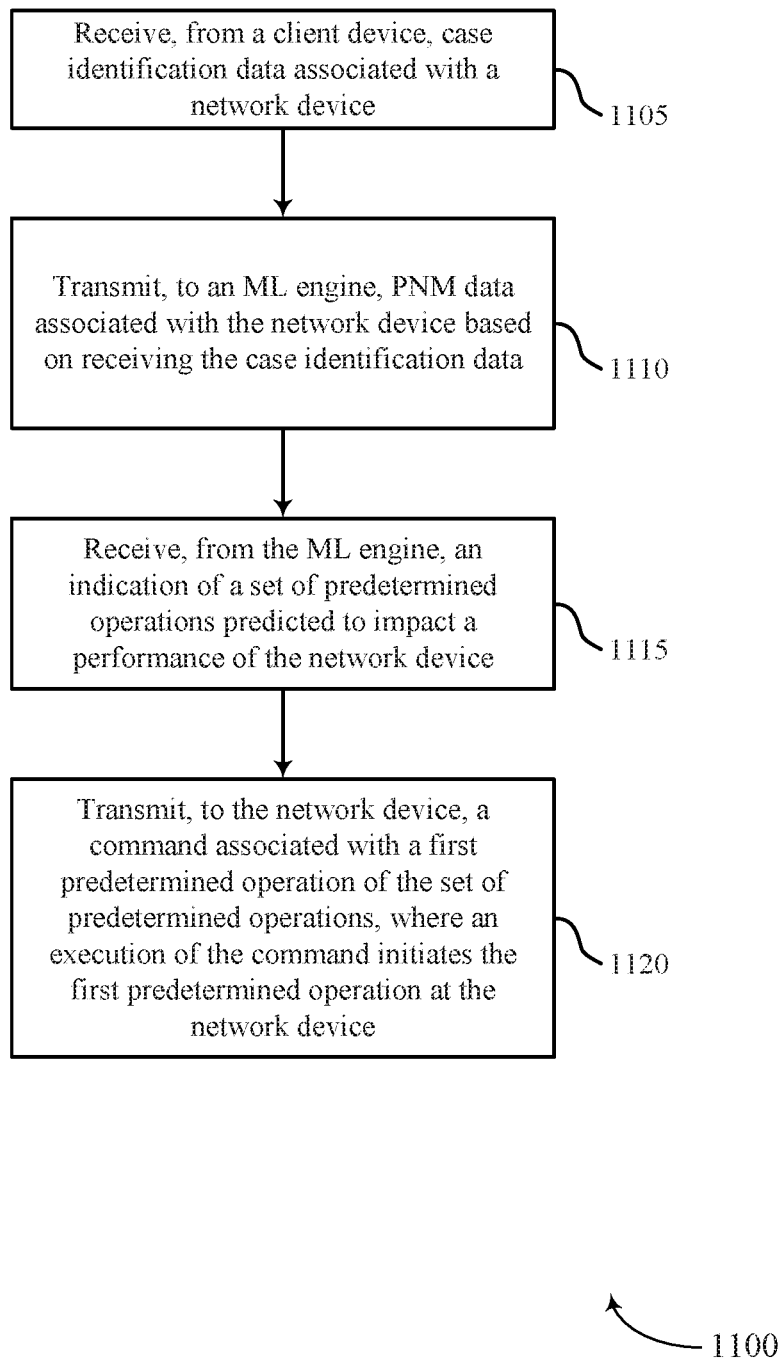

FIG. 11 shows a flowchart illustrating a method 1100 that supports methods for network maintenance in accordance with aspects of the present disclosure. The operations of method 1100 may be implemented by a controller or its components as described herein. In some examples, a controller may execute a set of instructions to control the functional elements of the controller to perform the described functions. Additionally or alternatively, a controller may perform aspects of the described functions using special-purpose hardware.

At 1105, the controller may receive, from a client device, case identification data associated with a network device. The operations of 1105 may be performed according to the methods described herein. In some examples, aspects of the operations of 1105 may be performed by an identification number manager as described with reference to FIG. 6.

At 1110, the controller may transmit, to an ML engine, PNM data associated with the network device based on receiving the case identification data. The operations of 1110 may be performed according to the methods described herein. In some examples, aspects of the operations of 1110 may be performed by a PNM data component as described with reference to FIG. 6.

At 1115, the controller may receive, from the ML engine, an indication of a set of predetermined operations predicted to impact a performance of the network device. The operations of 1115 may be performed according to the methods described herein. In some examples, aspects of the operations of 1115 may be performed by an operation indicator manager as described with reference to FIG. 6.

At 1120, the controller may transmit, to the network device, a command associated with a first predetermined operation of the set of predetermined operations, where an execution of the command initiates the first predetermined operation at the network device. The operations of 1120 may be performed according to the methods described herein. In some examples, aspects of the operations of 1120 may be performed by a command manager as described with reference to FIG. 6.

It should be noted that the methods described herein describe possible implementations, and that the operations and the steps may be rearranged or otherwise modified and that other implementations are possible. Further, aspects from two or more of the methods may be combined.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Although specific features of various embodiments of the disclosure may be shown in some drawings and not in others, this is for convenience only. In accordance with the principles of the disclosure, a particular feature shown in a drawing may be referenced and/or claimed in combination with features of the other drawings. For example, the following list of example claims represents only some of the potential combinations of elements possible from the systems and methods described herein.

The singular forms "a," "an," and "the" include plural references unless the context clearly dictates otherwise. "Optional" or "optionally" may indicate that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for maintaining a network, the method comprising:
   receiving first identification data associated with a report indicating a degraded performance of a first network device;
   in response to receiving the first identification data associated with the report indicating the degraded performance of the first network device, (i) accessing a record to determine a media access control (MAC) address of the first network device from the first identification data, and (ii) using a central proactive network maintenance (PNM) interface communicatively coupled to a plurality of PNM databases, determining, based on the MAC address of the first network device, which PNM database of the plurality of PNM databases contains PNM data corresponding to the first network device;
   obtaining, from a first PNM database of the plurality of PNM databases, first PNM data collected at least in part by the first network device at least partially prior to the report indicating the degraded performance of the first network device;
   transmitting the first PNM data to a machine learning (ML) engine;
   receiving, from the ML engine, an indication of a predetermined first operation that is predicted to improve the degraded performance of the first network device indicated by the report;
   transmitting the indication of the predetermined first operation; and
   transmitting, to the ML engine, an indication of whether the degraded performance of the first network device indicated by the report improves after the implementation of the predetermined first operation.

2. The method of claim 1, further comprising:
   receiving, from a client device, the indication of whether the degraded performance of the first network device indicated by the report improves after the implementation of the predetermined first operation.

3. The method of claim 1, further comprising:
   receiving second PNM data associated with the first network device after transmitting the indication of the predetermined first operation to a client device; and
   determining whether the degraded performance of the first network device indicated by the report improves after the implementation of the predetermined first operation at least in part on a comparison of the first PNM data and the second PNM data.

4. The method of claim 1, further comprising:
   receiving, from a client device, second identification data different than the first identification data, the second identification data associated with a second network device, wherein receiving the second identification data occurs after transmitting the indication of whether the degraded performance of the first network device indicated by the report improves after the implementation of the predetermined first operation;

transmitting, to the ML engine, second PNM data associated with the second network device based at least in part on receiving the second identification data; and receiving, from the ML engine, an indication of a predetermined second operation predicted to improve a performance of the second network device based at least in part on the indication of whether the degraded performance of the first network device improves.

5. The method of claim 1, further comprising:
receiving, from the ML engine, a plurality of indications of predetermined operations predicted to improve the degraded performance of the first network device indicated by the report, the plurality of indications comprising at least the indication of the predetermined first operation; and
receiving prioritization data associated with each of a plurality of predetermined operations indicated by the plurality of indications, wherein the prioritization data indicates a recommended order for implementing each of the plurality of predetermined operations based at least in part on a likelihood that implementing the predetermined operation improves the degraded performance of the first network device indicated by the report.

6. The method of claim 1, further comprising:
receiving, from a client device, an indication of a second operation different than the predetermined first operation; and
transmitting, to the ML engine, the indication of the second operation received from the client device.

7. The method of claim 1, wherein the indication of the predetermined first operation is an index associated with a text database, and the method further comprises:
referencing the text database according to the index; and
determining the predetermined first operation based at least in part on text indicated by the index.

8. The method of claim 1, wherein the first network device corresponds to an access point (AP).

9. The method of claim 1, wherein:
receiving the first identification data comprises receiving the first identification data from a client device;
transmitting the indication of the predetermined first operation comprises transmitting the indication of the predetermined first operation to the client device; and
the client device corresponds to a device connected to the network and used by an operator.

10. A method for maintaining a network, the method comprising:
receiving identification data associated with a report indicating a degraded performance of a network device;
in response to receiving the identification data associated with the report indicating the degraded performance of the network device, (i) accessing a record to determine a media access control (MAC) address of the network device from the identification data, and (ii) using a central proactive network maintenance (PNM) interface communicatively coupled to a plurality of PNM databases, determining, based on the MAC address of the network device, which PNM database of the plurality of PNM databases contains PNM data corresponding to the network device;
obtaining from a first PNM database of the plurality of PNM databases, first PNM data collected at least in part by the network device at least partially prior to the report indicating the degraded performance of the network device;

transmitting the first PNM data to a machine learning (ML) engine;
receiving, from the ML engine, an indication of a plurality of predetermined operations predicted to improve the degraded performance of the network device indicated by the report;
transmitting, to the network device, a command associated with a first predetermined operation of the plurality of predetermined operations that are predicted to improve the degraded performance of the network device indicated by the report, wherein an execution of the command initiates the first predetermined operation at the network device;
determining whether the degraded performance of the network device indicated by the report improves after the execution of the command at the network device; and
transmitting, to the ML engine, an indication of whether the degraded performance of the network device indicated by the report improves after the execution of the command at the network device.

11. The method of claim 10, wherein the command to the network device indicates for the network device to restart the network device, change a configuration of the network device, or both.

12. The method of claim 10, further comprising:
receiving, from an interface, second PNM data after the execution of the command at the network device, wherein determining whether the degraded performance of the network device indicated by the report improves after the execution of the command at the network device is based at least in part on a comparison of the second PNM data and the first PNM data.

13. The method of claim 10, further comprising:
determining that a performance of the network device is substantially the same as the performance of the network device prior to the execution of the command based at least in part on determining whether the degraded performance of the network device indicated by the report improves after the execution of the command at the network device; and
transmitting, to the network device, a second command associated with a second predetermined operation of the plurality of predetermined operations, wherein an execution of the second command initiates the second predetermined operation at the network device.

14. A method for maintaining a network, the method comprising:
receiving identification data associated with a report corresponding to a user of a network device indicating a degraded performance of the network device;
in response to receiving the identification data associated with the report corresponding to the user of the network device indicating a degraded performance of the network device, (i) accessing a record to determine a media access control (MAC) address of the network device from the identification data, and (ii) using a central proactive network maintenance (PNM) interface communicatively coupled to a plurality of PNM databases, determining, based on the MAC address of the network device, which PNM database of the plurality of PNM databases contains PNM data corresponding to the network device;
obtaining from a first PNM database of the plurality of PNM databases, first PNM data collected at least in part by the network device at least partially prior to the user of the network device indicating the degraded performance of the network device;

transmitting the first PNM data to a machine learning (ML) engine;

receiving, from the ML engine based at least in part on transmitting the PNM data, an indication of a predetermined operation predicted to improve the degraded performance of the network device indicated by the user of the network device; and transmitting the indication of the predetermined operation that is predicted to improve the degraded performance of the network device indicated by the user of the network device.

\* \* \* \* \*